United States Patent [19]

Wolford et al.

[11] Patent Number: 5,353,415
[45] Date of Patent: Oct. 4, 1994

[54] METHOD AND APPARATUS FOR CONCURRENCY OF BUS OPERATIONS

[75] Inventors: Jeff W. Wolford; Walter G. Fry, both of Spring, Tex.

[73] Assignee: Compaq Computer Corporation, Houston, Tex.

[21] Appl. No.: 955,477

[22] Filed: Oct. 2, 1992

[51] Int. Cl.5 ............................................. G06F 13/00
[52] U.S. Cl. .................................. 395/325; 395/425; 364/964.6; 364/964.341; 364/964.342; 364/DIG. 2
[58] Field of Search ............................. 395/325, 425; 364/243.41, DIG. 1, 964.6, 964.341, 964.342, DIG. 2

[56] References Cited

U.S. PATENT DOCUMENTS

| | | | |
|---|---|---|---|
| 4,261,034 | 4/1981 | Saccomano et al. | 395/275 |
| 4,571,672 | 2/1986 | Hatada et al. | 395/425 |
| 4,920,486 | 4/1990 | Nielsen | 395/325 |
| 4,987,529 | 1/1991 | Craft et al. | 395/325 |
| 5,072,369 | 12/1991 | Theus et al. | 395/425 |
| 5,119,485 | 6/1992 | Ledbetter, Jr. et al. | 395/425 |
| 5,157,774 | 10/1992 | Culley | 395/425 |
| 5,195,089 | 3/1993 | Sindhu et al. | 370/85.1 |
| 5,228,135 | 7/1993 | Ikumi | 395/425 |

FOREIGN PATENT DOCUMENTS

0468831  1/1992  European Pat. Off. ..... G06F 12/08

OTHER PUBLICATIONS

J. Cantrell, Futurebus+ Cache Coherence, Ire Wescon Convention Record, vol. 34, Nov. 1990, pp. 90–94.
J. Gallant, Futurebus+, EDN Electrical Design News, vol. 35, No. 20, Oct. 1990, pp. 87–94, 96, 98.
82495XP Cache Controller/82490XP Cache RAM Data Manual, Intel Corp. 1991, pp. 1–7, 11–34, 43–92.

*Primary Examiner*—Allen R. MacDonald
*Assistant Examiner*—Glenn A. Auve
*Attorney, Agent, or Firm*—Pravel, Hewitt, Kimball & Krieger

[57] ABSTRACT

A method and apparatus for performing concurrent operations on the host bus, expansion bus, and local I/O bus as well as the processor bus connecting the processor and cache system to increase computer system efficiency. A plurality of CPU boards are coupled to a host bus which in turn is coupled to an expansion bus through a bus controller. Each CPU board includes a processor connected to a cache system including a cache controller and cache memory. The cache system interfaces to the host bus through address and data buffers controlled by cache interface logic. Distributed system peripheral (DSP) logic comprising various ports, timers, and interrupt controller logic is coupled to the cache system, data buffers, and cache interface logic by a local I/O bus. The computer system supports various areas of concurrent operation, including concurrent local I/O cycles, host bus snoop cycles and CPU requests, as well as concurrent expansion bus reads with snooped host bus cycles.

8 Claims, 18 Drawing Sheets

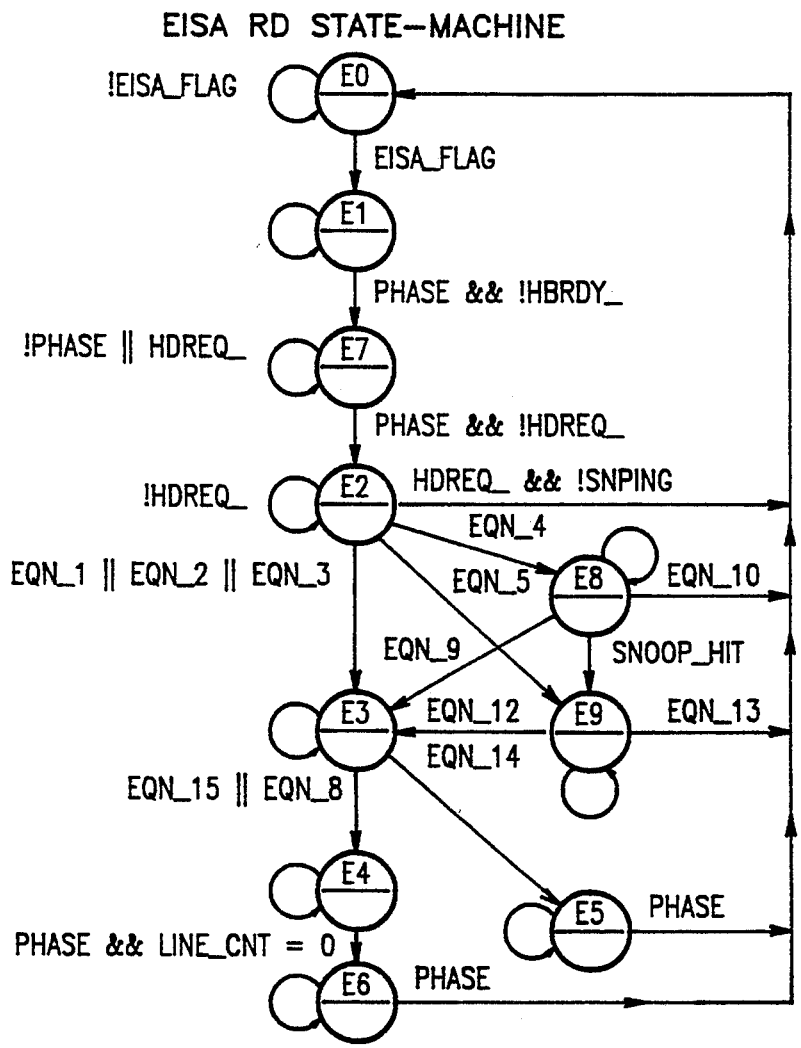

EISA RD STATE-MACHINE

EQN_1 = (HDREQ_ && TONE && !(SNPING || S_CSNPBSY_) && !LH_CDTS_)
EQN_2 = (HDREQ_ && (TTWO || ABORT_FLAG) && (LINE_CNT >= 1)
        && !(SNPING || !S_CSNPBSY_) && !LH_CDTS_)
EQN_3 = (HDREQ_ && (LINE_CNT = 3) && !(SNPING || !S_CSNPBSY_) && !LH_CDTS)
EQN_4 = (HDREQ_ && SNPING && !SNOOP_HIT)
EQN_5 = (HDREQ_ && SNPING && SNOOP_HIT)
EQN_6 = (PHASE && !(SNPING || !S_CSNPBSY_) && !LH_CDTS_)
EQN_7 = ((TTWO || ABORT_FLAG) && (LINE_CNT >= 1))
EQN_8 = (LINE_CNT = 3)
EQN_9 = EQN_6 && (TONE || EQN_7 || EQN_8)
EQN_10 = EQN_6 && !(TONE || EQN_7 || EQN_8)
EQN_11 = (PHASE && !SNOOP_HIT && !LH_CDTS_)
EQN_12 = EQN_11 && (TONE || EQN_7 || EQN_8)
EQN_13 = EQN_11 && !(TONE || EQN_7 || EQN_8)
EQN_14 = (TONE || (ABORT_FLAG && CLEN1))
EQN_15 = (TTWO || (ABORT_FLAG && CLEN1))

FIG. 5

ADDRESS BUFFER CONTROL STATE-MACHINE

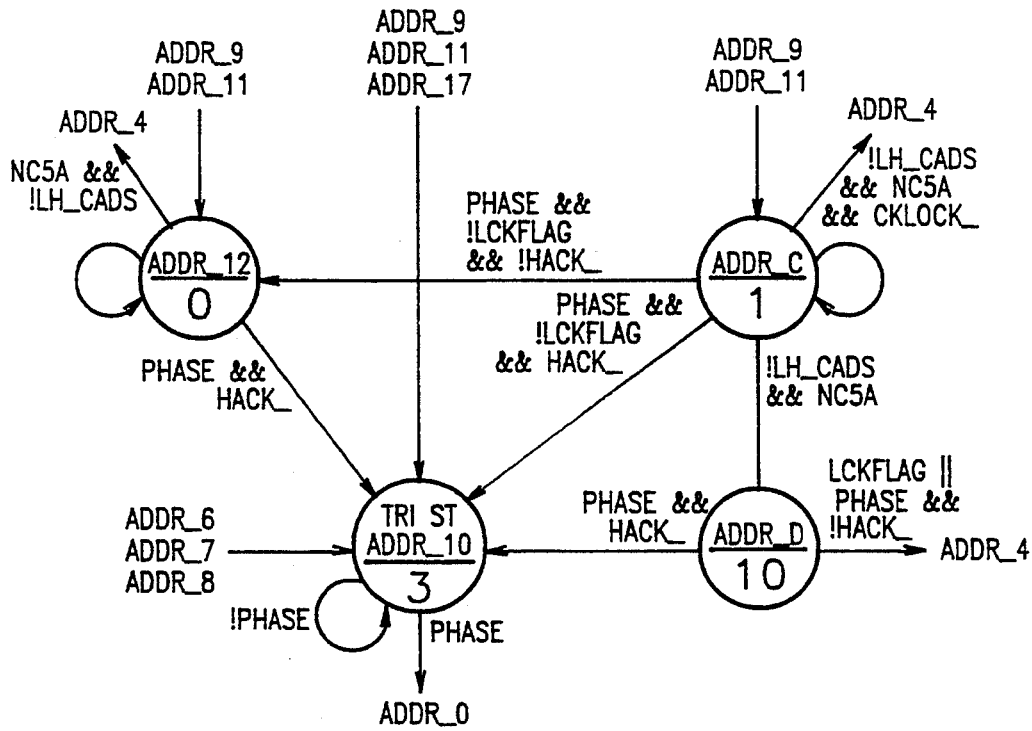

EQN_1 = !CM_IO_ || (LIO_VALID && !CM_IO_ && SNOTLOCAL)) || (SNOOP_HIT && !S_O_HBOFF_))
EQN_2 = !CRDY_ || EQN_LIO
EQN_3 = LIO_VALID && !CM_IO_ && SNOTLOCAL
EQN_4 = !CM_IO_ && EQN_LIO
EQN_5 = PHASE && !BUS_GRANT && HACK && EQN_3 && !HBUSY_OE_
EQN_6 = A_SNOOPING && SNOOP_HIT
EQN_7 = !SRHADS_ && HLOCAL_ && CE_RTRY
EQN_8 = EQN_7 && HACK_ && !LCKFLAG
EQN_9 = EQN_7 && !(HACK_ && !LCKFLAG)
EQN_10 = EQN_EOC && HACK_ && LCKFLAG
EQN_11 = EQN_EOC && !HACK_ && !LH_CADS_ && NC5A
EQN_12 = EQN_EOC && !HACK_ && (LH_CADS_ || !NC5A)
EQN_13 = PHASE && HBOFF_ && WR_BOFF
EQN_14 = PHASE && HBOFF_ && !WR_BOFF && HACK && !LCKFLAG
EQN_15 = PHASE && HBOFF_ && !WR_BOFF && HACK_ && LCKFLAG
EQN_16 = PHASE && HBOFF_ && !WR_BOFF && !HACK_ && !LH_CADS_ && NC5A
EQN_17 = PHASE && HBOFF_ && !WR_BOFF && !HACK_ && (LH_CADS_ || !NC5A)
EQN_18 = PHASE && HACK_ && !LCKFLAG
EQN_19 = PHASE && (!CE_RTRY || (ELR && LE_RTRY_))
EQN_20 = PHASE && (!HNA_ || (!HBLAST_ && !HBRDY_))
EQN_21 = (CM_IO_ && EQN_8) || (EQN_EOS && HACK_ && !LCKFLAG)
EQN_22 = EQN_10 || (EQN_12 && LCKFLAG)
EQN_LIO = (LIO_VALID && !SNOTLOCAL)
EQN_EOC = (!HNA_ || (!HBLAST_ && !HBRDY_ && !MYPIPE))

FIG. 6C

CONCURRENT LOCAL I/O
SNOOP WRITE-BACK — CPU CYCLE

CONCURRENT LOCAL I/O
SNOOP WRITE-BACK – CPU CYCLE

CONCURRENT EISA READ
SNOOP WRITE-BACK W/SNOOP WINDOW REDUCTION

CONCURRENT EISA READ
SNOOP WRITE-BACK W/SNOOP WINDOW REDUCTION

CONCURRENT EISA READ
SNOOP WRITE-BACK W/SNOOP WINDOW REDUCTION

METHOD AND APPARATUS FOR CONCURRENCY OF BUS OPERATIONS

FIELD OF THE INVENTION

The present invention relates to bus operations in computer systems, and more particularly to a method and apparatus for performing concurrent host bus, expansion bus, and local I/O bus operations in a computer system.

DESCRIPTION OF THE RELATED ART

Currently, most computer systems utilize two or more buses to interconnect the various components comprising the system. In one popular type of computer system, the processor or processors are connected to a processor/memory bus, commonly called a host bus, and the host bus is in turn coupled to an input/output bus or expansion bus. The expansion bus generally includes a number of slots for receiving optional add-in boards such as network interface cards, hard disk cards, or video cards. Other types of I/O devices such as the floppy disk logic, floppy disk controller, the keyboard controller, or various other types of peripherals may be connected to the expansion bus or optionally may be connected to a third bus, as necessary.

The following disclosure is not considered to be prior art as to the present disclosure, but is included to more fully explain the background of the present invention. In order to increase system efficiency, a new multiprocessor computer system design includes placing various logic such as the direct memory access (DMA) logic, timers, and interrupt control logic, local to each respective CPU, rather than having it situated on the expansion bus as in prior art systems. Thus, in this design, the respective processor control ports and other support logic for each processor is located on the respective processor card or CPU board. In addition, each CPU includes a local input/output (I/O) bus that is used by the processor to access this logic without having to access either the host bus or expansion bus. This reduces host bus traffic and increases system efficiency. For more information on the above system, please see U.S. Patent application Ser. No. 07/955,683 entitled ARRANGEMENT OF DMA, INTERRUPT AND TIMER FUNCTIONS TO IMPLEMENT SYMMETRICAL PROCESSING IN A MULTIPROCESSOR COMPUTER SYSTEM, filed concurrently herewith, which is hereby incorporated by reference.

Background on the operation of cache systems is deemed appropriate. Modern personal computer systems generally include one or more processors and a microprocessor cache memory system for each processor. A cache memory is a small amount of very fast, and expensive, zero wait state memory which is used to store frequently used code and data. The cache system is interfaced between the respective processor and the host bus and is used to bridge the gap between fast processor cycle times and slow memory access times.

When a processor generates a read request and the requested data resides in its respective cache memory, then a cache read hit takes place, and the processor can obtain the data from the cache memory without having to access main memory. If the data is not in the cache memory, then a cache read miss takes place, and the memory request is forwarded to the system and the data is retrieved from main memory, as would normally be done if the cache system did not exist. On a cache miss, the data that is retrieved from memory is provided to the processor and is also written into the cache memory due to the statistical likelihood that this data will be requested again by the processor. Likewise, if a processor generates a write request, the write data can be written to the cache memory without having to access main memory over the host bus (in a write-back cache). This increases processor efficiency and reduces host bus utilization, allowing more bandwidth for other processors and bus masters.

An efficient cache system yields a high "hit rate," which is the percentage of cache hits that occur during all memory accesses. When a cache system has a high hit rate, the majority of memory accesses are services with zero wait states. Also, since a cache system is usually located on the local bus of the microprocessor, cache hits are serviced locally without requiring use of the host bus. Therefore, a processor operating out of its local cache memory has a much lower "bus utilization." This reduces system bus bandwidth used by the processor, making more bandwidth available for other bus masters. Also, a processor can operate out of its local cache memory when it does not have control of the system bus, thereby increasing the efficiency of the computer system.

Two principal types of cache systems are referred to as write-through cache systems and write-back cache systems. In write-through systems, write data from the processor is written into the cache and is also immediately written into main memory. This guarantees that the copy of data in the cache memory is coherent or consistent with the data in main memory. A drawback of write-through cache systems is that host bus utilization is required for each processor write.

In a write-back cache system, processor write data is only written into the cache memory, and the write data is only written back to main memory when another device requests the data. When processor write data is written only into the cache system, the data held in the corresponding location in main memory is referred to as stale or invalid data. The cache location is said to hold modified or dirty data. In write-back cache systems, the cache controller is required to watch or "snoop" the host bus during cycles by other bus masters, as described below.

Cache management is generally performed by a device referred to as a cache controller. A principal cache management policy is the preservation of cache coherency. Cache coherency refers to the requirement that any valid copy of data in a cache must be identical to (or actually be) the owner of that location's data. The owner of a location's data is generally defined as the respective location having the most recent version of the data residing in the respective memory location. The owner of data can be either an unmodified location in main memory, or a modified location in a write-back cache.

In computer systems where independent bus masters can access main memory, there is a possibility that a bus master, such as another processor, or a direct memory access controller, network or disk interface card, or video graphics card, might alter the contents of a main memory location that is duplicated in the cache memory. When this occurs, the cache memory is said to hold "stale" or invalid data. Problems would result if the processor inadvertently obtained this invalid data. In order to maintain cache coherency, it is necessary for the cache controller to monitor the host bus when the processor does not control the host bus to see if another bus master accesses main memory. This method of monitoring the bus is referred to as snooping.

The cache controller must also monitor the host bus during main memory reads by a bus master in a write-back cache design because of the possibility that a previous processor write may have altered a copy of data in the cache memory that has not been updated in main memory. This is referred to as read snooping. On a read snoop hit where the cache memory contains data not yet updated in main memory, the cache controller generally provides the respective data to main memory and to the requesting bus master.

The cache controller must also monitor the system bus during memory writes because the bus master may write to or alter a memory location that resides in the cache memory. This is referred to as write snooping. On a write snoop hit, the cache entry is either marked invalid by the cache controller, signifying that this entry is no longer correct, or the cache memory is updated along with main memory.

Therefore, when a bus master reads or writes to main memory in a write-back cache design, or writes to main memory in a write-through cache design, the cache controller must latch the system address and see if the main memory location being accessed also resides in the cache memory. If a copy of the data from this location does reside in the cache memory, then the cache controller takes the appropriate action depending on whether a read or write snoop hit has occurred. This prevents incompatible data from being stored in main memory and the cache memory, thereby preserving cache coherency.

When a processor cache read miss occurs, i.e., when the processor requests data that does not reside in the cache memory then read cycles must be generated onto the host bus to obtain the requested data. If the data does not reside in main memory located on the host bus, but rather resides in memory located on the expansion bus, then the read cycles must propagate to the expansion bus to obtain the data. Background on write posting operations in computer systems is also deemed appropriate. An example of write posting occurs when an initiating device such as a microprocessor or cache controller performs a write operation to a destination device where the write cycle passes through an intermediary device, such as a bus controller or buffer. The processor executes the write cycle to the intermediary device with the expectation that the intermediary device will initiate a cycle or transfer to complete the write operation to the destination device being accessed. If the intermediary device includes write posting capability, the intermediary device will latch the address and data of the write cycle and immediately return a ready signal to the initiating device, indicating that the operation has completed. This allows the initiating device to perform useful work during the time required for the write operation to actually complete.

SUMMARY OF THE INVENTION

The present invention comprises a method and apparatus for performing concurrent operations on the host bus, expansion bus, local I/O bus, and local processor bus of a computer system to increase computer system efficiency. A plurality of CPU boards are coupled to a processor/memory bus, referred to as the host bus. The host bus is in turn coupled to an expansion bus through a bus controller. Each CPU board includes a processor connected to a cache system including a cache controller and cache memory. The cache system interfaces to the host bus through address and data buffers controlled by cache interface logic. A local I/O bus connects the cache system, data buffers, and cache interface logic to distributed system peripheral (DSP) logic comprising various ports, timers, and interrupt controller logic.

Cache interface logic according to the present invention initiates cycles on the local I/O bus and the host bus in response to operations of the processor, cache controller and host bus. The computer system includes posting capability whereby certain local I/O write cycles can be posted to the local I/O bus using the data buffer and cache interface logic. Also, write operations to the expansion bus are posted to the bus controller. Expansion bus reads are performed using a "split transactions" method, whereby once the read cycle is issued to the expansion bus, the host bus is released to allow other operations to continue. The read data is returned later to the requesting device during an idle period.

The computer system of the present invention employs a number of different types of concurrent operations, including:

1) a current CPU cycle concurrent with a previously posted local I/O write;
2) a current CPU cycle concurrent with a local memory write-through or local memory write-back;
3) a current local I/O cycle (postable or not) concurrent with snooping a host bus address and processing the possible write-back cycle;
4) an EISA bus read cycle concurrent with host bus cycles that cause snooping and write-back cycles;
5) an EISA bus read cache memory line-fill concurrent with host bus cycles that cause snooping and write-backs or other EISA bus accesses from other processors; and
6) a postable local I/O write cycle concurrent with a snoop of a host bus transaction, concurrent with a current CPU cycle request.

BRIEF DESCRIPTION OF THE DRAWINGS

A better understanding of the present invention can be obtained when the following detailed description of the preferred embodiment is considered in conjunction with the following drawings, in which:

FIG. 5 is a state transition diagram illustrating operation of the EISA read logic of FIG. 3;

FIGS. 6A, 6B, and 6C are state transition diagrams illustrating operation of the address buffer control logic of FIG. 3;

DETAILED DESCRIPTION OF THE PREFERRED EMBODIMENT

Figure 1:
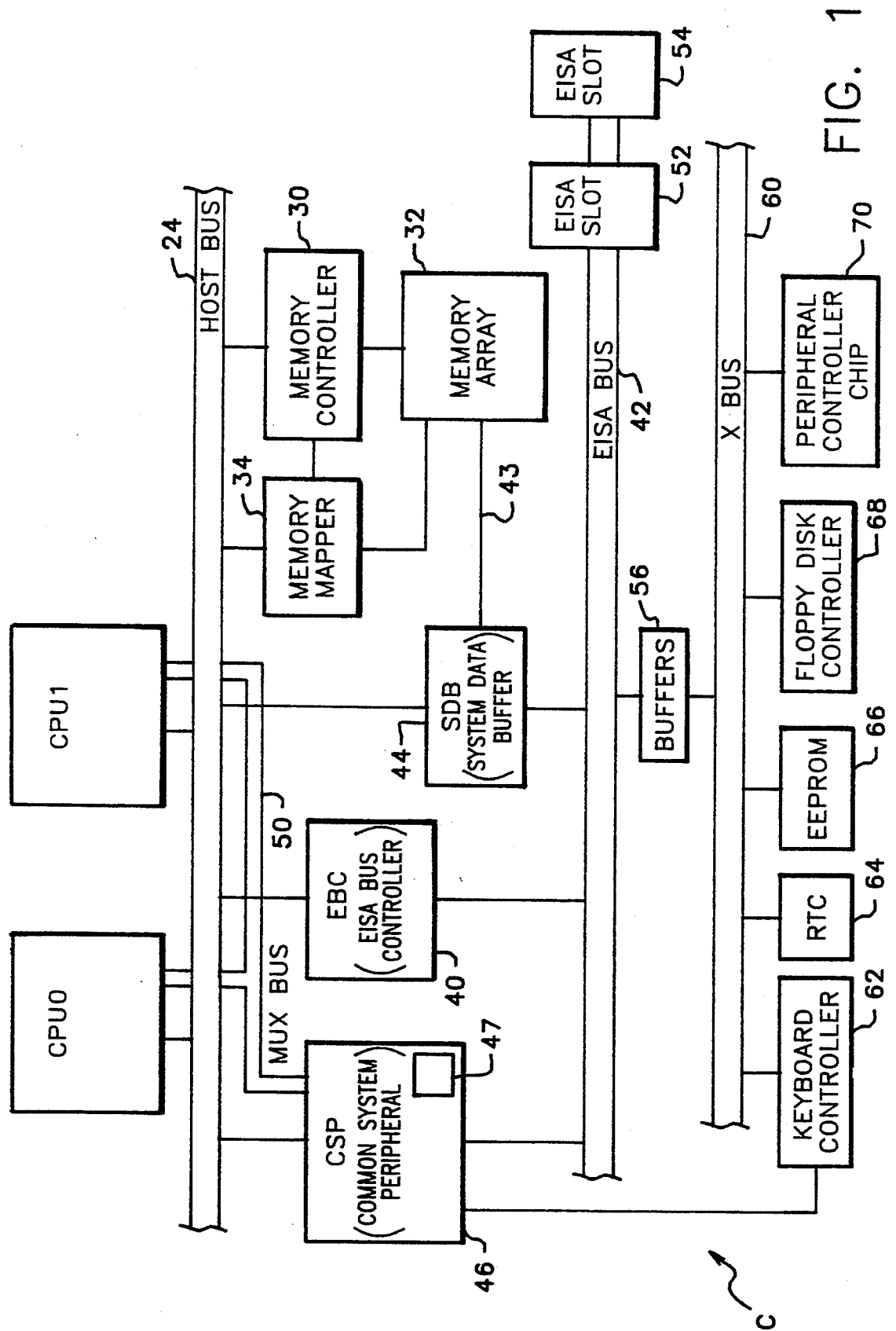
FIG. 1 is a block diagram of a computer system incorporating the present invention.

Referring now to FIG. 1, a computer system C is shown. The computer system C is a multiprocessor system in the preferred embodiment although the present invention may be incorporated into a single processor system. The computer system elements that are not discussed in detail below are not significant to the present invention other than to illustrate an example of a fully configured computer system. In the description that follows, signal names followed by "." are asserted when they have a logic low value. Signal names preceded by a "!" are the inverse of the signal without the "!."

The computer system C includes two CPU boards referred to as CPU0 and CPU1 connected to a host bus 24. A memory controller 30 is coupled to the host bus 24. A main memory array 32, preferably comprised of dynamic random access memory (DRAM) is coupled to the memory controller 30. Memory mapper logic 34 is coupled to the host bus 24, the memory controller 30 and the memory array 32. The memory mapper logic 34 provides memory mapping functions to facilitate memory accesses to the memory array 32.

A bus controller 40, preferably the EISA bus controller (EBC), is coupled between the host bus 24 and an expansion bus 42, preferably the Extended Industry Standard Architecture (EISA) bus. The EBC 40 provides various bus cycle translation and conversion functions to facilitate transfers between the host bus 24, the EISA bus 42, and a memory bus 43. The EBC 40 includes a 64 bit buffer for gathering read data that has been requested by a device on the EISA bus 42.

A system data buffer (SDB) 44 is also coupled between the host bus 24, the EISA bus 42, and the memory array 32 to allow data flow between the three elements. The SDB 44 is coupled to the memory array 32 by the memory bus 43. A logic block referred to as the common system peripheral (CSP) 46 is coupled between the host bus 24 and the EISA bus 42. The CSP 46 is also coupled through a MUX bus 50 to a logic block referred to as the distributed system peripheral (DSP) (FIG. 2) in each of CPU0 and CPU1. The CSP 46 is also coupled to a keyboard controller 62.

The CSP 46 includes various system functions including a direct memory access (DMA) controller, EISA arbitration controller, and numerous system board logic functions such as memory refresh control, among others (all not shown). The CSP 46 also includes interrupt receive logic which receives the various interrupt signals from the various peripheral and I/O devices and transmits these interrupt request signals to the DSP logic in each of CPU0 and CPU1 via the MUX bus 50. The DSP (FIG. 2) includes an interrupt controller, timers, portions of the DMA system, CPU ports, and other processor related items. For more information on the operation of the MUX bus 50, please see related copending application Ser. No. 07/955,683, entitled MULTIPLEXED COMMUNICATION PROTOCOL BETWEEN CENTRAL AND DISTRIBUTED PERIPHERALS IN MULTIPROCESSOR COMPUTER SYSTEMS, filed concurrently with this application, which is hereby incorporated by reference.

The EISA bus 42 includes a plurality of EISA slots 52 and 54 for receiving EISA bus master expansion cards, for example, a network interface card or a hard disk interface card. The EISA bus 42 is coupled through buffers 56 to a bus referred to as the X bus 60. A number of peripheral devices are coupled to the X bus 60 including the keyboard controller 62, a real time clock (RTC) 64, EEPROM (electrically erasable programmable read only memory) 66, a floppy disk controller 68, and a peripheral controller chip 70 which includes numerous ports and UARTS (universal asynchronous receiver/transmitters).

Figure 2:
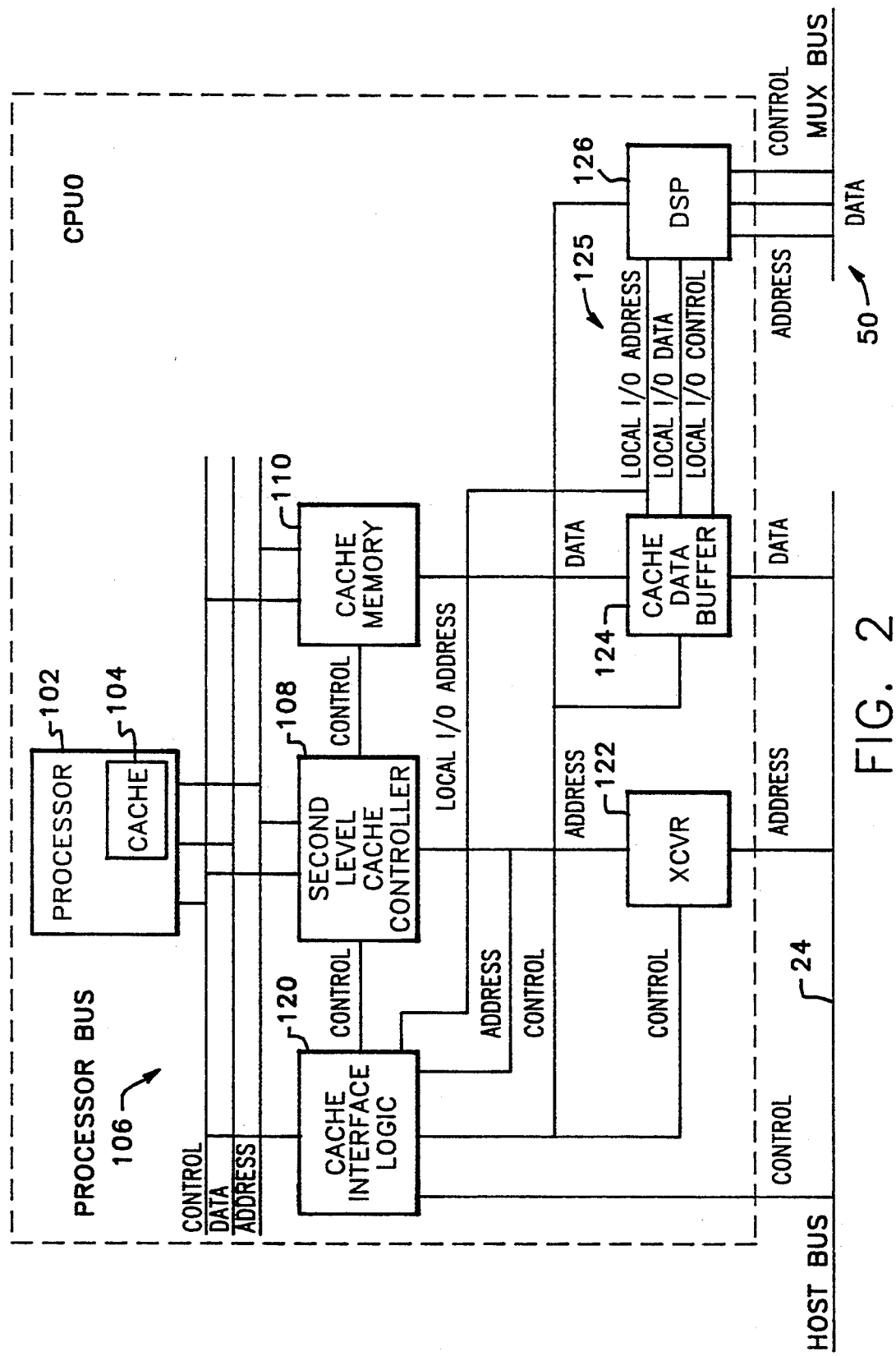
FIG. 2 illustrates a CPU board of FIG. 1.

Referring now to FIG. 2, a block diagram of CPU0 is shown. CPU0 and CPU1 operate in an identical manner, the only difference being that only CPU0 generates a memory refresh in the preferred embodiment. In the following description, CPU0 is described for simplicity, and the description applies equally well to CPU1. CPU0 includes a processor 102 which preferably includes an internal cache 104. The processor 102 is preferably the Intel i486 processor. However, the use of other types of processors is also contemplated. The processor 102 is coupled to a processor bus 106 including control, data and address portions, as shown.

A second level cache controller 108 is coupled to the control and address portions of the processor bus 106. Cache memory 110 is coupled to the data and address portions of the processor bus 106. The second level cache controller 108 connects to the cache memory 110 via various control lines as shown. The second level cache controller 108 is preferably the C5 or 82495 cache controller produced by Intel. The cache memory 110 preferably comprises the C8 or 82490 RAMs produced by Intel which are normally used with the C5 cache controller. The C5 is a second level cache controller for the i486 processor that works in conjunction with the C8 RAMs to provide a unified write-back data and instruction cache which is transparent to system software. The cache memory 110 is organized with a 256 bit line size. Although this configuration is used in the preferred embodiment, other configurations may of course also be used.

Cache interface logic 120 is coupled to the second level cache controller 108 through control lines and is coupled to the control portion of the processor bus 106, as shown. The address pins of the second level cache controller 108 are connected to a transceiver 122 which in turn is connected to the host bus 24. The address pins of the second level cache controller 108 are also connected to the cache interface logic 120. The address lines coupled between the second level cache controller 108 and the transceiver 122 are bi-directional, meaning that the second level cache controller 108 can drive an address through the transceiver 122 onto the host bus 24 and can also receive an address from the host bus 24 through the transceiver 122. The data pins of the cache memory 110 are connected to a cache data buffer 124 which in turn is connected to the host bus 24. The cache data buffer 124 is connected to the DSP 126 via a local I/O bus 125 comprising local I/O address, data and control lines, as shown. The cache interface logic 120 provides a portion of the local I/O address to the local I/O address lines coupled between the cache data buffer 124 and the DSP 126. The cache memory 110 also provides control lines to the DSP 126. The DSP 126 is connected through the MUX bus 50 to the CSP 46 (FIG. 1).

The cache interface logic 120 is connected to the host bus 24 via control lines and also is connected to the address transceiver 122, the cache data buffer 124 and the DSP 126 via control lines. The control lines from the cache interface logic 120 to the address transceiver 122 and the cache data buffer 124 act as host bus output enables for both the second level cache controller 108 and the cache memory 110.

The cache interface logic 120 provides the required bus controller functions to interface the second level cache system comprising the second level cache controller 108 and cache memory 110 with the host bus 24. The cache interface logic 120 provides necessary signal interpretation and translation functions between the second level cache controller 108 and the host bus 24.

Figure 3:
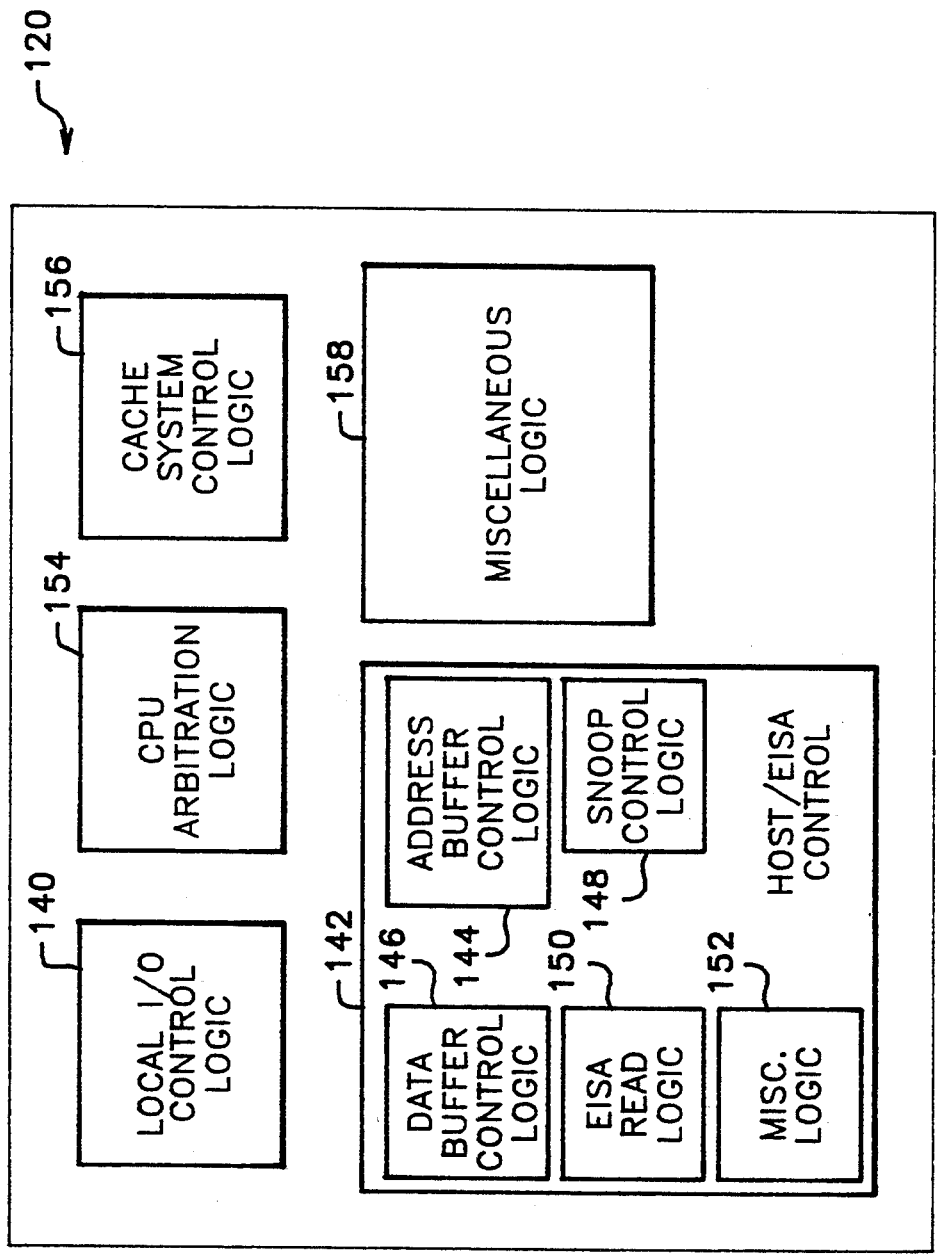
FIG. 3 is a more detailed diagram of the cache interface logic of FIG. 2.

Referring now to FIG. 3, the cache interface logic 120 includes local I/O bus control logic 140 which controls operation of the local I/O bus and DSP 126. The cache interface logic 120 also includes host/EISA control logic 142 which controls host bus and EISA bus operations. The host/EISA control logic 142 includes address buffer control logic 144 which controls operation of the address buffers 122, data buffer control logic 146 which controls operation of the cache data buffer 124, snoop control logic 148 which controls snooping functions, EISA read logic 150 which controls EISA read cycles, and miscellaneous logic 152. The cache interface logic 120 further includes CPU arbitration control logic 154 which controls host bus arbitration by the CPU, cache system logic 156 which controls operations of the cache controller 108 and cache memory 110 and miscellaneous logic 158.

Computer System Operation

The processor 102 initiates read cycles by providing the respective address and control signals to the cache controller 108. The processor 102 initiates write cycles by providing the respective address and control signals to the cache controller 108 and the write data to the cache memory 110. On memory accesses, the cache controller 108 compares the respective address with the addresses of cached locations and determines whether a hit or miss occurs. If a cache read hit occurs, the cache memory 110 provides the requested data back to the processor 102. If a cache write hit occurs, the cache memory preferably updates its copy of data with the new write data and marks the location as "dirty". I/O data is not cached, and thus no cache look-up is necessary for I/O accesses.

When a cache read or write miss occurs in the second level cache system, or if an I/O access occurs, the second level cache controller broadcasts the requested address to the cache interface logic 120 and also provides the address to the address transceiver 122. If a write is involved and the write destination is noncacheable, then the write data is stored in the cache data buffer 124. The cache controller 108 asserts a cache address strobe signal CADS. to the cache interface logic 120 in order to request an access as a result of a transfer from the CPU. If the CM/IO. signal indicates an I/O access and the cache interface logic 120 is not currently generating a snoop request, the cache interface logic 120 enables the address outputs of the cache controller 108. The cache interface logic 120 performs an address decode to determine if the requested address requires a host bus cycle or requires access to ports in the DSP 126.

If the address is directed to a port in the DSP 126, then the cache interface logic 120 provides a portion of the local I/O address to the DSP 126. The cache data buffer 124 provides the lower two bits of the local I/O address, these being byte enable signals. The cache interface logic 120 includes the capability of posting certain write cycles to the DSP 126. On a postable write cycle to the local I/O bus 125, once the cache interface logic 120 receives the destination address and the cache data buffer 124 receives the write data, the cache controller 108 is allowed to perform other operations. Local I/O read cycles as well as certain types of local I/O write cycles cannot be posted.

A local I/O cycle is run on I/O accesses to addresses in the DSP 126. Local I/O accesses do not propagate out to the host bus 24 and are handled by the cache interface logic 120, cache data buffer 124, and DSP 126 in order to minimize the impact to host bus bandwidth. By allowing these accesses to be performed using a separate bus, the local I/O bus 125, host bus cycles by other devices are allowed to continue. In order to maintain cache coherency, however, these accesses must be snooped by the cache controller 108.

Local I/O accesses do impact the host bus 24 in two ways. First, the cache controller 108 is unable to snoop host bus transfers while driving out an address, and it is necessary to drive the cache controller 108 address to decode it to determine if it is an access to a local I/O port. Second, the cache controller 108 is unable to snoop host bus cycles after it receives a bus grant signal referred to as CBGT.. The period of time during which the cache controller 108 is unable to snoop is referred to as the non-snoop window.

As long as the cache controller 108 is presenting an address on its outputs, the cache controller 108 is unable to snoop host bus transfers. Thus, if a host bus cycle begins while the cache controller 108 is driving an address to the cache interface logic 120, the cache interface logic 120 asserts a delay signal referred to as HPAUSE. onto the host bus 24 to delay completion of the host bus cycle for snooping purposes, thus minimizing the possible cache coherency effects that local I/O transfers may have on the host bus 24. For more information on this host bus delay feature, please see copending application Ser. No. 743,420 entitled "MULTI-PROCESSOR CACHE SNOOP ACCESS PROTOCOL" filed Aug. 30, 1991, which is hereby incorporated by reference.

Also, the cache controller 108 receives the bus grant signal CBGT. from the cache interface logic 120 during its cycles which indicates that the cache controller 108 has control of the host bus 24. After the CBGT. signal is asserted, the cache controller 108 can perform no other function, including snooping, until the current cycle it generated has completed. Non-snoop window reduction logic included in the cache interface logic 120 delays assertion of the CBGT. signal during local I/O read and write cycles to reduce the non-snoop window. The non-snoop window reduction logic is incorporated into the local I/O control logic 140 and the EISA read logic 150, as described further below.

In the case of posted local I/O write cycles, the CBGT. signal is only asserted during the time when the write is actually posted. During non-postable local I/O write cycles, the CBGT. signal is only asserted to complete the cycle after the write data has reached the DSP 126. During local I/O read cycles, the CBGT. signal is only asserted when the read data has been provided from the DSP 126 to the cache data buffer 126 and the cache memory data path is available. For information on the manner in which the non-snoop window is reduced, please see related copending application Ser. No. 07/955,901, entitled "METHOD AND APPARATUS FOR NON-SNOOP WINDOW REDUCTION" and filed concurrently herewith, which is hereby incorporated by reference.

If the address requires a host bus cycle, the cache interface logic 120 enables the address transceiver 122 to present the address onto the host bus 24. In the case of a memory read, the memory mapper logic 34 indicates whether the requested data resides in the memory array 32 on the host bus 24 or resides in memory situated on the EISA bus 42. In the case of a memory write, the memory mapper logic 34 indicates whether the destination of the write data is the memory array 32 or memory situated on the EISA bus 42. I/O accesses that do not involve ports in the DSP 126 will necessarily propagate to the EISA bus 42. If the cycle requires use of the memory array 32, then the cache interface logic 120 initiates host bus cycles to perform the transfer.

If the cycle involves memory or I/O situated on the expansion bus 42, then the cache interface logic 120 generates a host bus cycle to the EBC 40 which in turn generates cycles on the EISA bus 42 to perform the transfer. In the case of write cycles, the EBC 40 includes posting capability whereby write cycles to the EISA bus 40 are posted. Once the EBC 40 receives the destination address and write data, the EBC 40 returns a ready signal to the respective CPU, thus allowing other operations to continue.

On read operations to memory or I/O situated on the EISA bus 42, a type of "posting" referred to as split transactions is performed. In these operations, the read operation is issued to the EISA bus 42, but the host bus 24 is released so other operations can continue. The EBC 40 gathers data in up to 64 bit chunks and provides this data to the host bus. When a respective chunk of data has been gathered by the EBC 40, it is provided over the data lines in the host bus 24 to the requesting device during an idle period. For more information on "split transactions" operations, please see application Ser. No. 07/955,930, entitled SPLIT TRANSACTIONS AND PIPELINED ARBITRATION OF MICROPROCESSORS IN MULTIPROCESSING COMPUTER SYSTEMS, and filed concurrently herewith, which is hereby incorporated by reference.

In the case of host bus cycles and posted expansion bus write cycles, the cycle occurs very quickly, and thus host bus utilization is not impacted. On expansion bus memory read cycles, the second level cache controller 108 generates cycles that propagate to the expansion bus 42 to obtain the data. The non-snoop window reduction logic operates to delay assertion of the CBGT_ signal while the second level cache controller 108 is waiting for the data to be returned, thus allowing the cache controller 108 to snoop other host bus cycles during this time.

Therefore, during the time while the cache controller 108 is waiting for data to be returned from the expansion bus 42 or local I/O bus 125, other processors or bus masters can use the host bus 24. Also, the cache controller 108 can snoop host bus cycles during a large portion of local I/O write cycles, whether posted or not.

Concurrency

The following are some areas or types of concurrency that are supported by the cache interface logic 120 of the present invention. These concurrency types are referenced throughout the remainder of this specification.

1) a current CPU cycle concurrent with a previously posted local I/O write;
2) a current CPU cycle concurrent with a local memory write-through or local memory write-back;
3) a current local I/O cycle (postable or not) concurrent with snooping a host bus address and processing the possible write-back;
4) an EISA bus read concurrent with host bus cycles that cause snooping and write-backs;
5) an EISA bus cache memory read line-fill concurrent with host bus cycles that cause snooping and write-backs or other EISA bus accesses from other processors; and
6) a postable local I/O write concurrent with a snoop of a host bus transaction, concurrent with a current CPU cycle request.

During concurrency types 1, 3, 4, 5 and 6, the non-snoop window reduction logic operates to reduce the non-snoop window and allow the cache controller 108 otherwise involved in a cycle to snoop. This reduces the number of cycles where a snoop would have to be held off because a cycle is in progress involving the cache controller 108, without reducing the overall performance of the current cycle.

Since concurrency type 6 covers types 1, 2 and 3 and type 4 covers the basics of type 5, further detail is provided on the concurrency types 6 and 4.

Figure 4A:
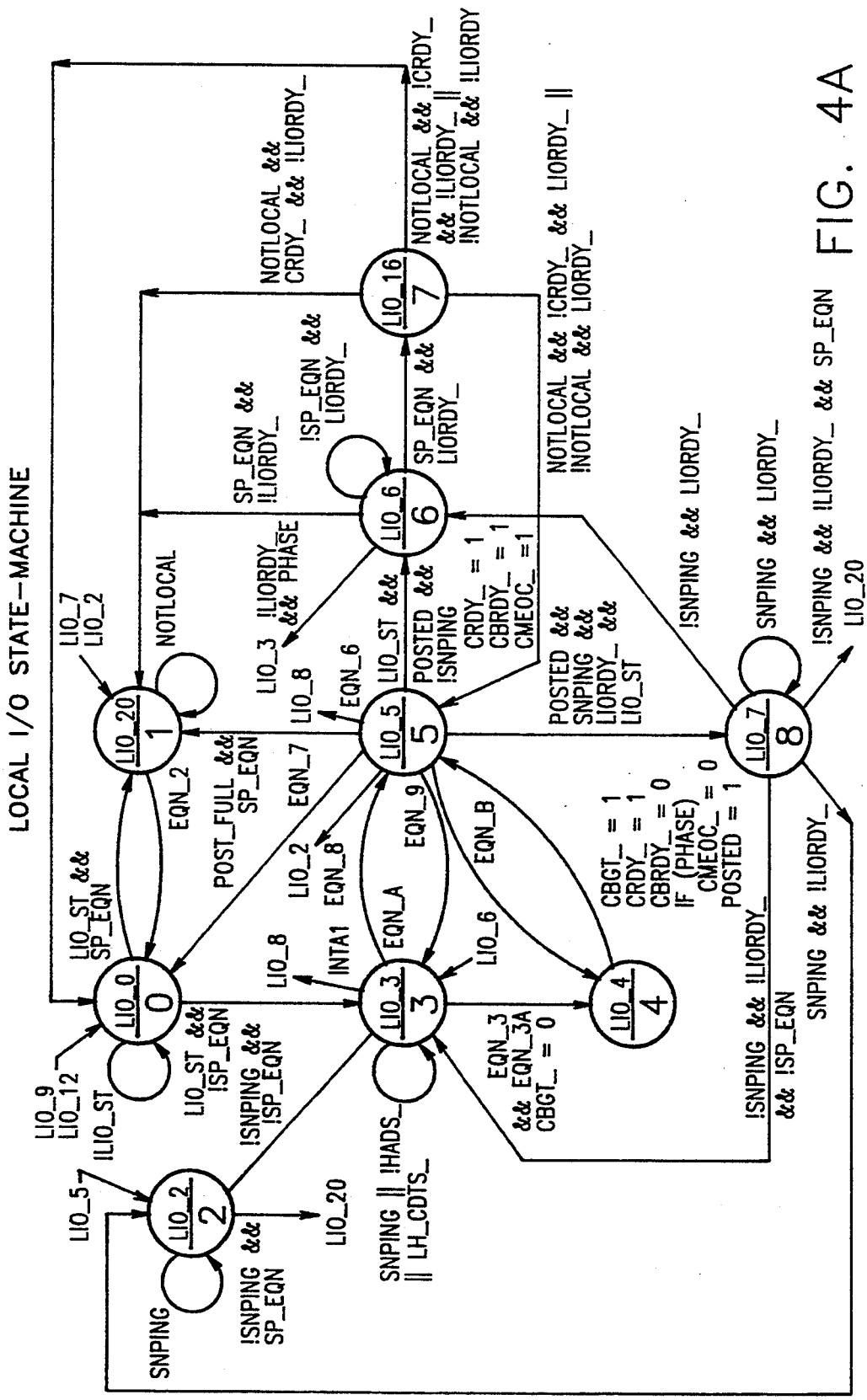
FIGS. 4A and 4B are state transition diagrams illustrating operation of the local I/O control logic of FIG. 3.
Figure 4B:
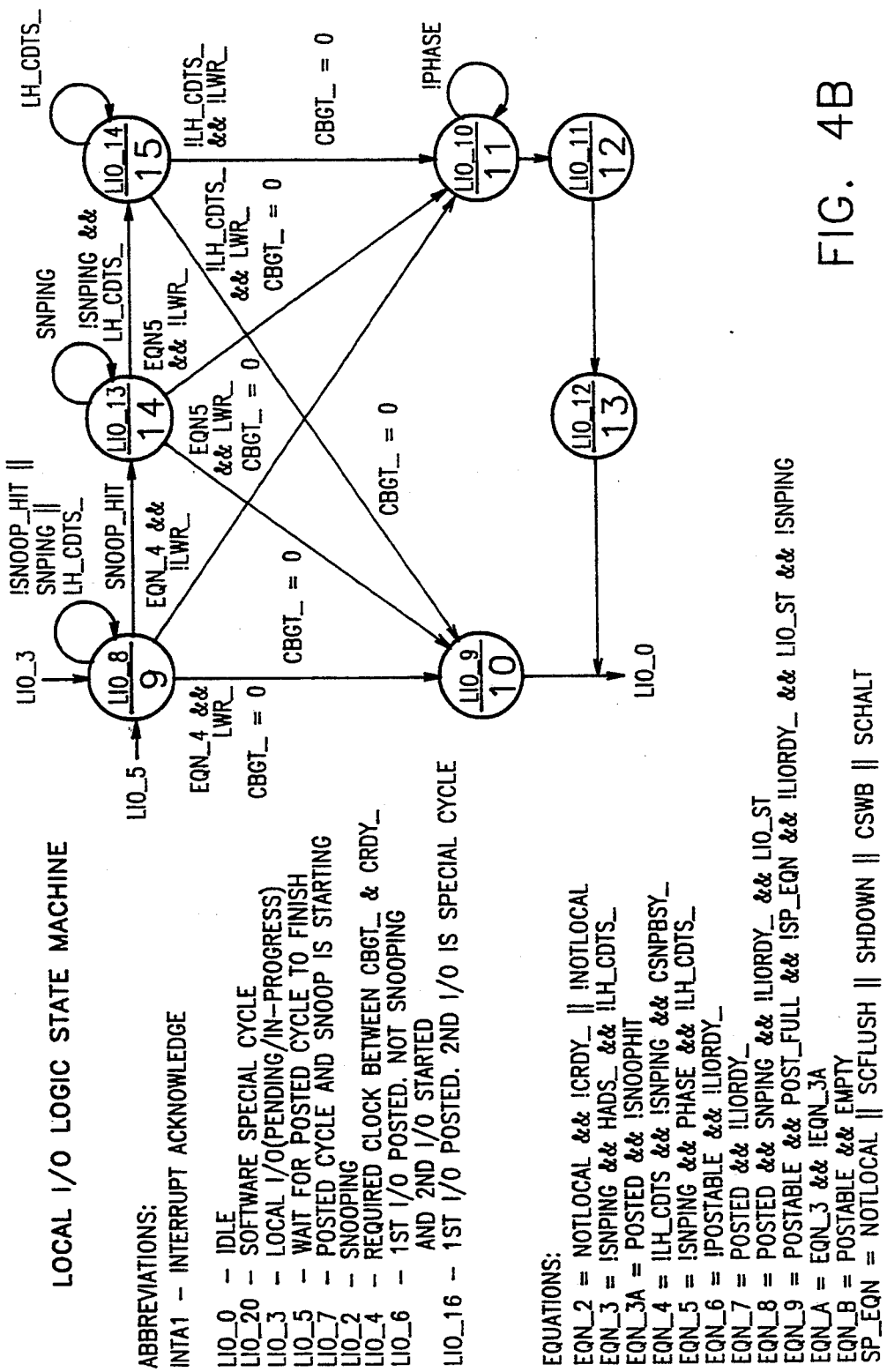

In order to more fully explain the manner in which concurrency is accomplished according to the present invention, FIGS. 4A–B, 5, 6A–B, 7, 8, and 9 are state transition diagrams illustrating operation of the principal cycle control logic in the cache interface logic 120. FIGS. 4A–B and 5, which illustrate the state machines for the local I/O control logic 140 and EISA read control logic 150, are discussed in detail as the operation of this logic most clearly demonstrates the concurrency aspects of the present invention. The remaining state machines controlling bus operations are included for convenience. All of the disclosed state machines are discussed with reference to the timing diagrams in FIGS. 10A–B and FIGS. 11A–C, which best illustrate the concurrency aspects of the present invention. In the state machine descriptions, transfers are made only on the indicated conditions. Control remains at the state in all other cases.

Local I/O State Machine

Referring now to FIGS. 4A and 4B, a state transition diagram illustrating operation of a state machine referred to as the local I/O state machine is shown. This state machine controls the operations of the local I/O bus 125. States are referenced by the value above the line in each state "bubble." States LIO20 and LIO16 in this state machine are not relevant to the present invention, and thus discussion of these states as well as transitions to or from these states has been omitted for clarity and brevity. In addition, the signals associated with equations SP_EQN and EQN_2 are not discussed. The symbol "&&" indicates "AND" and the symbol " || " represents "OR."

A brief review of the signals used in this state machine is deemed appropriate.

A signal referred to as HCLK is a host bus clocking signal having a frequency of 25 or 33 MHz.

A signal referred to as PCLK is a processor clocking signal having a frequency twice that of the HCLK signal.

A signal referred to as PHASE is logic high in the positive or rising edge of the HCLK signal and is a low on the falling edge of the HCLK signal.

A signal referred to as LIORDY. is a local I/O bus ready signal that indicates completion of a local I/O cycle.

A signal referred to as LIO.ST indicates that either a local I/O cycle or software special cycle is beginning. A software special cycle is indicated by SP.EQN being true. On a local I/O cycle, SP.EQN is false.

A signal referred to as HLOCAL. is asserted to indicate that requested data or the destination of write data resides on the host bus 24 and is negated to indicate that a cycle requires memory on the expansion bus 42.

A signal referred to as POSTABLE indicates that the cycle is a write cycle that can be posted.

A signal referred to as POST.FULL indicates that the posting buffer is full.

A signal referred to as EMPTY indicates that the posting buffer is empty.

A signal referred to as POSTED indicates that a write cycle has been posted. When negated, the !POSTED signal indicates that the cycle is either non-postable or is an otherwise postable cycle that has not yet been posted.

A signal referred to as SNOOP.HIT indicates that a snoop hit has occurred in the cache controller 108.

A signal referred to as SNPING indicates that the cache controller 108 is performing either a snoop look-up cycle or snoop write-back cycle.

A signal referred to as CSNPBSY. signal is asserted to indicate that the cache controller 108 is doing a back invalidation to the respective CPU in the instance where it cannot snoop the host bus 24.

A signal referred to as CDTS. is a pulse asserted during a read to indicate that on the next PCLK signal cycle the CPU data bus path is available and is asserted during a write cycle to indicate that the write data is available to be supplied to the destination memory.

A signal referred to as LH.CDTS is a latched and held version of the CDTS. signal.

The following equations are used in FIG. 6 for clarity:

EQN.3=!SNPING && HADS. && !LH.CDTS.
EQN.3A=POSTED && !SNOOP.HIT
EQN.4=!LH.CDTS && !SNPING && CSNPBSY.
EQN.5=!SNPING && PHASE && !LH.CDTS.
EQN.6=!POSTABLE && !LIORDY
EQN.7=POSTED && !LIORDY.
EQN.8=POSTED && SNPING && !LIORDY. && LIO.ST
EQN.9=POSTABLE && POST.FULL && !SP.EQN && !LIORDY. && LIO.ST && !SNPING
EQN.A=EQN.3 && !EQN.3A
EQN.B=POSTABLE && EMPTY

The state machine begins in state LIO0, and all states lead to this state upon a system reset. The state machine transitions on the rising edge of the PCLK signal. The state machine advances from state LIO0 to state LIO3 when a local I/O cycle is begun, signified by the LIO ST signal being asserted. This may be either a local I/O read or local I/O write cycle. The state machine remains in state LIO3 while the equation:

SNPING || HADS || CDTS.

is true. Thus, the state machine remains in state LIO3 if the cache controller 108 is either snooping the host bus, or a processor 102 has generated a cycle onto the host bus 24 that may be required to be snooped, or the processor data path is not available. The state machine advances from state LIO3 to state LIO4 when the equation:

SNPING && HADS. && !CDTS. && !SNOOP.HIT && POSTW is true. Thus, the state machine advances from state LIO3 to state LIO4 on a postable write cycle when the cache controller 108 is not snooping a host bus cycle, a snoop write hit has not occurred, no new host bus cycle has been generated, and the processor data path is available.

In state LIO3 when the subsequent cycle is determined to be state LIO4, the CBGT. signal is asserted, indicating for the first time to the cache controller 108 that the cycle may begin. By delaying the assertion of the CBGT. signal until the transition from state LIO3 to state LIO4, the non-snoop window is reduced. The state machine advances from state LIO4 to state LIO5 on the next HCLK signal cycle. In state LIO5, the state machine returns to state LIO0 when the posted write cycle actually completes, meaning that the data is actually transferred to the DSP 126. This is signified by the equation:

POSTED && !LIORDY.

Therefore, the transition from state LIO0 to LIO3 to LIO4 to LIO5 and back to LIO0 occurs on a posted local I/O write cycle where no snooping cycles are required and the posted write actually completes to the DSP 126 before any new local I/O cycles are generated.

The state machine transitions from state LIO3 to state LIO5 if the cycle has not been posted, i.e., either the cycle is a read cycle, a non-postable write cycle, or an otherwise postable write cycle where either the posting buffer is full or the cycle has not yet been posted, or a snoop hit occurs. This is signified by the equation:

EQN.3 && EQN.3A

The state machine returns from state LIO5 to state LIO3 if the equation:

POSTABLE && POST.FULL && !SP.EQN && !LIORDY. && LIO.ST && !SNPING is true. Thus, if the cycle is a postable write cycle, the state machine returns from state LIO5 to state LIO3 when the LIORDY. signal is asserted, indicating that a prior local I/O cycle has completed, thus freeing up the posting buffer.

The state machine advances directly from state LIO5 to state LIO4 when the equation:

POSTABLE && EMPTY is true. Thus, the state machine returns from state LIO5 directly to state LIO4 if the cycle is a postable write and the posting buffer is empty. The CBGT. signal is asserted in state LIO5 when the next transition is from state LIO5 to state LIO4.

If a postable write cycle completes posting in state LIO5, the cache controller 108 is not snooping, and a new local I/O cycle begins, the state machine advances from state LIO5 to state LIO6, signified by the equation:

LIO_ST && POSTED && !SNPING

In state LIO6, the state machine waits for the write cycle to actually complete at the DSP 126. When the cycle completes, the state machine returns from state LIO6 to state LIO3. This is signified by the equation:

!LIORDY_ && PHASE

After reaching state LIO3 from state LIO6, the state machine then advances to either state LIO4 or state LIO5 depending on the new cycle type.

As previously noted, the state machine also advances from state LIO3 to state LIO5 due to a snoop hit occurring in the cache system. The state machine advances from state LIO5 to state LIO7 if a new local I/O cycle has begun, the current cycle is a postable write cycle that has been posted but has not completed to the DSP 126, and the cache controller 120 is snooping, signified by the equation:

POSTED && SNPING && LIORDY_ && LIO_ST

The state machine remains in state LIO7 while the cache controller 108 is snooping and the current cycle has not completed, signified by the equation:

SNPING && LIORDY_

If the snoop hit that caused the transition from state LIO3 to LIO5 was to a dirty line in the cache memory 110, then the cache controller 108 performs a write-back cycle in state LIO7. Thus here concurrency of operations occurs with the local I/O cycle being performed while the snoop write-back is being performed.

The state machine advances from state LIO7 to state LIO6 if the cache controller 108 completes snooping (completes the write-back, if necessary) before the current cycle completes, signified by the equation:

!SNPING && LIORDY_

The state machine returns from state LIO7 to state LIO3 if the snoop cycle completes and the LIORDY_ signal is asserted, indicating that the current local I/O cycle has completed. This is signified by the equation:

!SNPING && !LIORDY_ && !SP_EQN

The state machine advances from state LIO7 to state LIO2 if the cache controller 108 is still snooping on the next HCLK signal cycle and the current local I/O cycle completes, signified by the equation:

SNPING && !LIORDY_

The state machine remains in state LIO2 while the cache controller 108 finishes snooping the current host bus cycle, i.e., completes the write-back cycle, if applicable. The state machine returns from state LIO2 to state LIO3 when the cache controller 108 completes snooping.

The state machine advances from state LIO5 directly to state LIO2 if a new local I/O cycle has begun, the current cycle is a postable write cycle that has completed to the DSP 126, and the cache controller 120 is snooping, signified by the equation:

POSTED && SNPING && !LIORDY && !LIOST

The state machine returns from state LIO2 to state LIO3 when the cache controller 120 completes snooping.

Therefore, the normal flow for a posted local I/O write cycle is LIO0→LIO3→LIO4→LIO5. From state LIO5, the state machine transitions to either state LIO0, LIO6 or LIO3, depending on whether a new local I/O cycle issues before the current cycle completes. A snoop cycle requires use of states LIO7 and LIO2. Thus, on local I/O write cycles the local I/O logic 148 delays assertion of the CBGT_ signal until the write cycle is either posted for a postable cycle or until the write cycle actually completes for a non-postable write. This allows a longer period of host bus snooping and increases host bus utilization.

If the cycle is a read cycle or non-postable write cycle, the state machine advances from state LIO5 to state LIO8 (FIG. 4B), signified by the equation:

!POSTABLE && !LIORDY being true, which is when the current local I/O cycle finishes. On a read cycle, the asserted LIORDY signal indicates that the read data has been returned from the DSP 126 to the cache data buffer 124. On a non-postable write cycle, the asserted LIORDY signal in state LIO5 indicates that the write operation has completed at the DSP 126.

If the cycle is a read cycle, the state machine advances from state LIO8 to state LIO10 to complete the respective read cycle when the cache data path is available and the cache controller 120 is not snooping, signified by the equation:

EQN.4 && !LWR_

The CBGT_ signal is asserted in state LIO8 when the next state of the state machine is state LIO10. By delaying the assertion of the CBGT_ signal until state LIO8, after the read data has been returned to the cache data buffer 124 and the cache memory data path is available, the non-snoop window is reduced. The state machine remains in state LIO10 until the PHASE signal is asserted, whereupon the state machine advances to states LIO11 and LIO12 to complete the cycle. Upon completion of the cycle, the state machine then returns to state LIO0.

The state machine advances from state LIO8 to state LIO9 to complete a non-postable write cycle, signified by the equation:

EQN.4 && LWR_

Since in this instance the cycle is a write cycle that has already completed, the asserted CDTS signal in EQN.4 is not a significant condition for this state transition.

The CBGT_ signal is asserted in state LIO8 when the next state of the state machine is state LIO9. By delaying the assertion of the CBGT_ signal until state LIOS, after the non-postable write cycle has completed, the non-snoop window is reduced. In state LIO9, various other ready signals are returned to complete the cycle, and the state machine returns to state LIO0.

The state machine advances from state LIO8 to state LIO13 if a snoop hit occurs to the cache controller 108, signified by the SNOOP_HIT signal being asserted. The state machine remains in state LIO13 while the SNPING signal is asserted, which for a snoop hit to a dirty line in the cache memory 110 is while the write-back cycle is being performed.

Thus here it is noted that concurrent operations on the local I/O bus 125 and the host bus 24 are occurring. The local I/O cycle is waiting for the cache memory data path to become available while the write-back cycle is being performed on the host bus 24. This is concurrency type 3. It is also noted that a new CPU cycle can be initiated at this time during a previously posted local I/O write, this being concurrency type 1.

If the cache controller 108 completes snooping and the cache memory data path is available, the state machine advances to either states LIO10 or LIO9, depending on whether the cycle is a read or write cycle, respectively. These transitions are signified by the equations:

EQN_5 && !LWR_ to advance to state LIO10 for a read cycle and

EQN_5 && LWR_ to advance to state LIO9 for a write cycle. The CBGT_ signal is asserted in state LIO13 when the next state transition is to either states LIO9 or LIO10. By delaying assertion of the CBGT_ signal until after the snoop operations complete, the non-snoop window is reduced.

If the cache controller 108 completes snooping and the cache memory data path is not yet available, the state machine advances to state LIO14, signified by the equation:

!SNPING && LH_CDTS_

The state machine remains in state LIO14 until the data path is available. When the cache memory data path is available, the state machine advances to either states LIO10 or LIO9, depending on whether the cycle is a read or write cycle, respectively. These transitions are signified by the equations:

!CDTS_ && !LWR_ to advance to state LIO10 for a read cycle and

!CDTS_ && LWR_ to advance to state LIO9 for a write cycle. The CBGT_ signal is asserted in state LIO14 when the next state transition is to either states LIO9 or LIO10. Again, by delaying assertion of the CBGT_ signal, the non-snoop window is reduced.

Therefore, the cache interface logic 120 asserts the associated local I/O control signals to the cache data buffer 124 once it has determined that a local I/O access is required. The cache data buffer 124 then carries out the read operation in concert with the DSP 126. Meanwhile, the cache controller 108 is free to snoop host bus transfers since the CBGT_ signal was never asserted by the cache interface logic 120 and the cache interface logic 120 no longer needs the cache controller address.

Once the local I/O read is completed, the cache data buffer 124 responds by asserting the LIORDY_ signal to indicate to the cache interface logic 120 that the read data is available in the cache data buffer 124. The cache interface logic 120 then asserts the CBGT_ signal to indicate to the cache controller 108 that it plans on completing the transfer. From this point on until the completion of the local I/O read, the cache controller 108 is unable to snoop host bus transfers, and the cache interface logic 120 must assert the HPAUSE_ signal if a host bus cycle is detected to a snoopable and cacheable address. The cache interface logic 120 completes the cycle by transferring the read data from the cache data buffer 124 into the cache memory 110 and asserting the CRDY_ signal to the cache controller 108 to complete the cycle.

If a snoop hit occurs while waiting for the local I/O read data, the cache controller 108 initiates the write-back to memory. The cache interface logic 120 responds with the appropriate control signals to complete the transfer. In this instance, concurrent snoop write-back cycles and local I/O cycles are occurring in the computer system. It is further noted that another CPU cycle request can occur during a postable local I/O write concurrently with a cache controller snoop of a host bus transaction. This is concurrency type 6, as well as types 1 and 2.

The local I/O state machine monitors the LIORDY_ signal so that the cache interface logic 120 knows that the read data is available when the write-back is completed. Once the write-back is complete, the cache controller 108 re-issues the local I/O access. The cache interface logic 120 enables the obtained local I/O read data onto the cache memory data bus. Since the cache data buffer 124 has already asserted LIORDY_, the cache interface logic 120 asserts the CBGT_ signal to the cache controller 108 and completes the transfer by clocking the data into the cache memory 110 and asserting the CRDY_ signal. Once the CBGT_ signal is asserted, all cacheable and snoopable host bus cycles are delayed using the HPAUSE signal so that the cache controller 108 will be able to snoop them once it has competed the current local I/O transfer.

EISA read state machine

Referring now to FIG. 5, a state transition diagram illustrating operation of the EISA read logic 150 is shown. Prior to discussing the state machine, a brief review of the signal names used in the state machine is deemed appropriate.

A signal referred to as HCLK is a host bus clocking signal having a frequency of 25 or 33 MHz.

A signal referred to as PCLK is a processor clocking signal having a frequency twice that of the HCLK signal.

A signal referred to as PHASE is logic high in the positive or rising edge of the HCLK signal and is a low on the falling edge of the HCLK signal.

A signal referred to as HLOCAL_ is asserted to indicate that requested data or the destination of write data resides on the host bus 24 and is negated to indicate that a cycle requires memory on the expansion bus 42.

A signal referred to as HBLAST_ is asserted to indicate the last cycle of a burst transfer.

A host burst ready signal referred to a HBRDY_ indicates to a host bus master that a data transfer is complete. The asserted HBRDY_ signal at the end of a data transfer causes the respective master and slave to burst to the next transfer unless the cycle is the last burst cycle, signified by the HBLAST_ signal being asserted, or the cycle has been terminated. If the HBRDY_ signal is asserted and the requested data resides on the expansion bus 42, signified by the HLOCAL_ signal being inactive, then the read or write is presumed to have been posted to the expansion bus 42, and no bursting occurs.

A signal referred to as HDREQ_ is used during expansion bus "posted" reads. If the EBC 40 has an available or open read buffer, it returns the HBRDY_ signal and the HBLAST_ signal to indicate that it has received the EISA read request. When the EBC 40 has obtained the data from the EISA bus 42, it asserts the HDREQ_ signal and waits for a valid time to deassert the signal. When the HDREQ_ signal is sampled inactive after being active, then requested read data is valid on the host data bus 24.

A signal referred to as SNOOP_HIT indicates that a snoop hit has occurred in the cache controller 108.

Signals referred to as TONE and TTWO indicate how much data are being returned from the EISA bus 42 on an EISA read cycle. The TONE signal indicates that 64 bits are being returned and the TTWO signal indicates that 128 bits are being returned. When an EISA read cycle has been posted and the data to be returned is cacheable data, then generally the cache interface logic 120 and cache data buffer 124 gather a sufficient amount of data, i.e. 256 bits, to perform a line fill in the cache controller 108. However, if a processor write to the EISA bus 42 occurs before all of this data has been gathered to the EBC 40, then cache coherency concerns are presented. In this situation, a signal referred to as ABORT_FLAG is asserted, and the cache interface logic 120 and cache data buffer 124 only gather sufficient data to minimally satisfy the processor read request and do not gather enough data to perform a full EISA line fill. The cache interface logic 120 also designates this data as non-cacheable to prevent this data from being cached. The TONE and TTWO signals are used to indicate which minimum amount of data, either 64 bits or 128 bits respectively, are being supplied back to the processor 102 to satisfy the processor read request in these situations.

A two bit signal referred to as LINE_CNT indicates how many 64 bit blocks of data have been returned from the EISA bus during an EISA read line fill cycle. The two bits comprising LINE_CNT have a 0 value if 64 bits are being returned, a value of 1 for 128 bits, a value of 2 for 192 bits, and a value of 3 for 256 bits.

A signal referred to as SNPING indicates that the cache controller 108 is performing either a snoop lookup cycle or snoop write-back cycle.

A signal referred to as CSNPBSY_ signal is asserted to indicate that the cache controller 108 is doing a back invalidation to the respective CPU in the instance where it cannot snoop the host bus 24.

A signal referred to as S_CSNPBSY_ is a version of the CSNPBSY signal synchronized to the rising edge of the HCLK signal.

A signal referred to as CDTS_ is asserted during a read to indicate that on the next PCLK signal cycle the CPU data bus path is available and is asserted during a write cycle to indicate that the write data is available to be supplied to the destination memory.

A signal referred to as LH_CDTS_ is a latched and held version of the CDTS_ signal.

A signal referred to as CLEN0 indicates that the current CPU bus cycle comprises one or two transfers.

A signal referred to as CLEN1 indicates that the length of the CPU bus cycle is four transfers.

A signal referred to as EISA_FLAG indicates that the cache controller 108 has generated a cycle that is destined for the EISA bus 42.

The following equations are used to simplify FIG. 4:
EQN.1 = (HDREQ_ && TONE && !(SNPING || !S_CSNPBSY_) && !LH_CDTS)
EQN.2 = (HDREQ_ && (TTWO || ABORT_FLAG) && (LINE_CNT=1) && !(SNPING || !S_CSNPBSY_) && LH_CDTS_)
EQN.3 = (HDREQ_ && (LINE_CNT=3) && !(SNPING || !S_CSNPBSY_) && !LH_CDTS_)
EQN.4 = (HDREQ_ && SNPING && !SNOOP_HIT)
EQN.5 = (HDREQ_ && SNPING && SNOOP_HIT)
EQN.6 = (PHASE && !(SNPING || !S_CSNPBSY_) && !LH_CDTS_)
EQN.7 = ((TTWO || ABORT_FLAG) && (LINE_CNT=1))
EQN.8 = (LINE_CNT=3)
EQN.9 = EQN.6 && !(TONE || EQN7 || EQN.8)
EQN.10 = EQN.6 && !(TONE || EQN.7 || EQN.8)
EQN.11 = (PHASE && !SNOOP_HIT && !LH_CDTS_)
EQN.12 = EQN.11 && (TONE || EQN.7 || EQN.8)
EQN.13 = EQN.11 && !(TONE || EQN.7 || EQN.8)
EQN.14 = (TONE || (ABORT_FLAG && !CLEN1))
EQN.15 = (TTWO || (ABORT_FLAG && !CLEN1))

The state machine includes ten states referred to as E0-E9. The state machine begins in state E0, and all states lead to this state upon an asserted reset signal. The state machine transitions on the rising edge of the PCLK signal. The state machine remains in state E0 while the EISA_FLAG signal is negated, i.e., while no processor initiated cycles are destined for the EISA bus 42. The state machine transitions from state E0 to state E1 when the EISA_FLAG signal is asserted, indicating that a cycle has been generated which is destined for the EISA bus 42. The state machine remains in state E1 while the HBRDY_ signal is negated high. The state machine transfers from state E1 to state E7 when the HBRDY_ signal is asserted on the rising edge of the HCLK signal cycle, signified by the equation:

PHASE && !HBRDY_

The HBRDY_ signal is asserted by the EBC 40 to indicate that it has received the EISA read request.

In state E7, the EBC 40 is performing EISA read cycles, gathering the requested read data to be provided back to the requesting cache controller 108 at a later time. During state E7, the requesting cache controller 108 is snooping the host bus 24 while other processors and bus masters perform host bus cycles. If the requesting cache controller 108 detects a snoop hit to a dirty line, then the cache controller will perform a write-back cycle to provide the correct copy of data to the requesting device. This demonstrates concurrency types 4 and 5.

The state machine transitions from state E7 to E2 when the HDREQ_ signal is asserted on the rising edge of the HCLK signal, indicating that the EBC 40 has received up to 64 bits of the requested data from the EISA bus 42 and is presenting it to the host bus 24. The state machine remains in state E2 while the HDREQ_ signal is asserted.

The state machine returns from state E2 to state E0 when the HDREQ_ signal is deasserted, indicating that data presentation on the host data bus 24 has been completed, the cache controller 108 is not snooping any cycles on the host bus 24, indicated by the SNPING signal being negated, and more EISA read data is required to satisfy the read request. Upon returning to state E0, the state machine again returns to state E7 to gather another chunk of up to 64 bits of data and then present this data onto the host bus 24 in state E2. For cache memory line fills, which require 256 bits of data, this sequence occurs four times and requires four host bus cycles.

The state machine advances from state E2 to state E8 if the HDREQ. signal is deactivated, indicating that the requested data has been presented on the host bus 24 and, in addition, the cache controller 108 is snooping a cycle on the host bus 24, but a snoop hit has not yet been determined. This is signified by the equation:

(HDREQ. && SNPING && !SNOOP.HIT)

The state machine advances from state E2 to state E9 when the HDREQ. signal is deasserted, the cache controller 108 is snooping, and a snoop hit has been determined. This is signified by the equation:

(HDREQ. && SNPING && SNOOP.HIT)

The state machine advances from state E8 to state E9 when a snoop hit is determined in state E8.

The state machine returns from state E8 to state E0 after the snoop cycle completes if the cache interface logic 120 needs to retrieve more data using EISA bus cycles to satisfy the request. If the cache interface logic 120 was performing a cache memory line fill and a CPU or other bus master has also just performed a write to a memory location, resulting in abortion of the EISA line fill, then the state machine returns from state E8 to E0 if more read data is required to minimally satisfy the read request. This is signified by EQN.10. The state machine returns from state E9 to state E0 when the snoop write-back cycle has completed, the cache controller 108 has reissued the CADS. signal, and the cache interface logic 120 needs to retrieve more data using EISA bus cycles.

The state machine transfers from state E9 to state E3 when EQN.12 is true, i.e., the SNOOP.HIT signal has been deasserted, the processor data bus is available, and the cache interface logic 120 and cache data buffer 124 have obtained the required data from the EISA bus 42 that is to be transferred to the processor 102. It is also noted that the state machine transfers from state E8 to state E3 if these conditions are true in state E8, signified by EQN.9 being true.

Thus, the state machine returns from either states E8 and E9 to E0 if the cache interface logic 120 and cache data buffer 124 need to gather additional data. States E8 and E9 are involved with the situation where there has been a host bus snoop cycle while EISA read data was being presented onto the host bus 24. The state machine advances from either state E8 or state E9 to state E3 when the snoop cycle completes, the EISA read cycle is reissued by the cache controller 108 and the cache data buffer 124 has the correct amount of data that is to be transferred to the requesting processor 102.

In the situation where there has not been an intervening write operation on the host bus 24 while the EISA bus operations are being performed, and the cache data buffer 124 has the correct amount of data that is to be transferred to the requesting processor 102, the state machine simply transfers from state E2 to state E3. The state machine also transitions from state E2 to E3 if an intervening EISA write operation occurred, resulting in abortion of the cache memory line fill, and the cache data buffer 124 has the correct amount of data. The transition from state E2 to E3 is signified by any of EQN.1, EQN.2 or EQN.3 being true.

In summary, the state machine eventually reaches state E3 when the host bus 24 is clear of any cycles, the cache controller data path is clear, and the cache data buffer 124 has the correct amount of data that is to be transferred to the requesting processor 102, which requested the data.

The state machine transfers from state E3 to state E5 if only one 64 bit transfer is to be performed on the host bus 24, signified by EQN.14 being true. When the transfer completes in state E5, the state machine returns to state E0 when the PHASE signal is asserted. The state machine advances from state E3 to state E4 if either two or four 64 bit transfers are required to return the EISA read data to the requesting cache controller 108 on the host bus 24. The state machine remains in state E4 while the LINE.CNT bits are not equal to 0. When either two or four host bus transfers have completed and the LINE.CNT bits have been decremented to 0 in state E4, then the state machine advances to state E6 and then returns to state E0 on the rising edge of the HCLK signal cycle.

The CBGT. signal is asserted in either of states E4 or E5. In this manner, the CBGT. signal is asserted to the cache controller 108 only after all of the requested data has been obtained through the required number of EISA bus cycles and gathered into the cache data buffer 124 to be returned to the cache controller 108. This reduces the non-snoop lockout window, allowing the cache controller 108 to concurrently snoop other host bus cycles during prior states as necessary while the data is being gathered from the EISA bus 42. This allows other host bus processors or bus masters to perform cycles on the host bus 24 while an EISA read cycle is pending by a respective CPU, thus allowing concurrent operations and increasing system efficiency.

Address Buffer Control State Machine

A brief review of the signals used in the address buffer control state machine not previously described is deemed appropriate.

A signal referred to as BUS.GRANT is an internal cache interface signal indicating that the cache interface has gained control of the host bus 24.

A signal referred to as HBUSY.OE is an output enable signal generated by the cache interface logic 120 which enables the HBUSY signal onto the host bus 24.

A signal referred to as NC5A indicates that the cache controller 108 has generated a new address that has not yet been latched by the cache interface logic 120.

A signal referred to as LCKFLAG is asserted during LOCKed cycles, which are uninterruptible cycles used by the i486 processor.

A signal referred to as SNOTLOCAL is a version of the NOT.LOCAL signal synchronized with the rising edge of the PCLK signal.

A signal referred to as LIO.VALID is high to indicate that the SNOT.LOCAL signal can be examined.

A signal referred to as HA.RST is a host address reset signal.

A signal referred to as S.CM.IO. is a version of the CM.IO. signal synchronized to the rising edge of the PCLK signal.

A signal referred to as A_SNOOPING indicates that the cache controller 108 is performing or about to perform a tag or address compare cycle.

A signal referred to as CKLOCK_ is a request by the CPU to perform LOCKed cycles.

A signal referred to as SRHADS_ is a signal that is pulsed one HCLK signal cycle after the last HADS_ signal cycle. Generally, the HADS_ signal is a single pulse, but it can be stretched by host bus pipelining.

A signal referred to as CRDY_ is a cache controller ready input signal indicating the end of a cycle.

A signal referred to as CE_RTRY informs a host bus master that an EISA cycle of the same type requested is already in progress and can not be posted, and thus must be retried at a later time.

A signal referred to as HACK_ is a host bus acknowledge signal generated by arbitration logic in the memory controller 30 used to grant a requesting bus master control of the host bus 24.

A signal referred to as MYPIPE indicates that the respective cache interface logic 120 has a host bus cycle pipelined on top of a previous cycle it had generated.

Figure 6A:
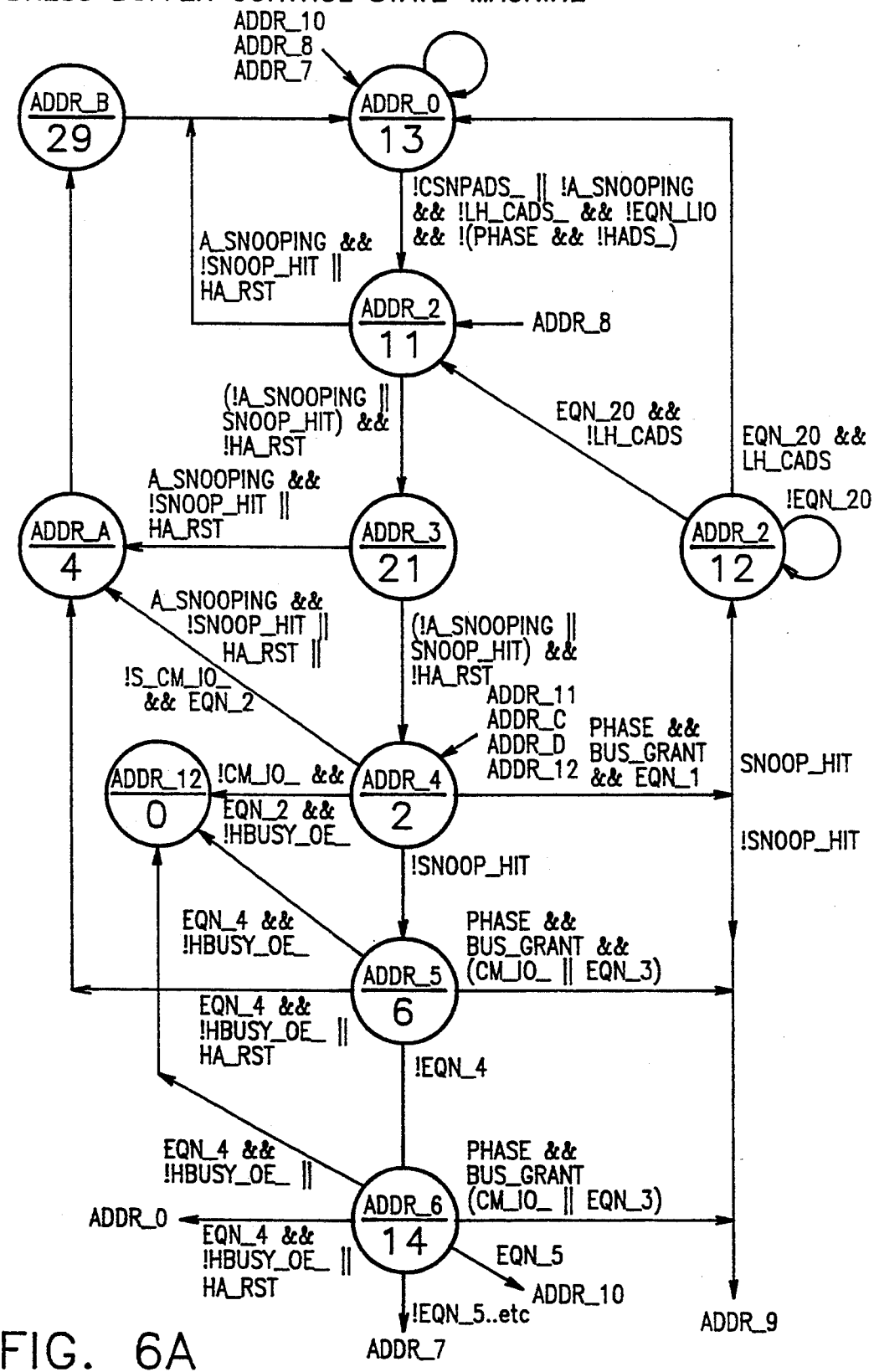
Figure 6B:
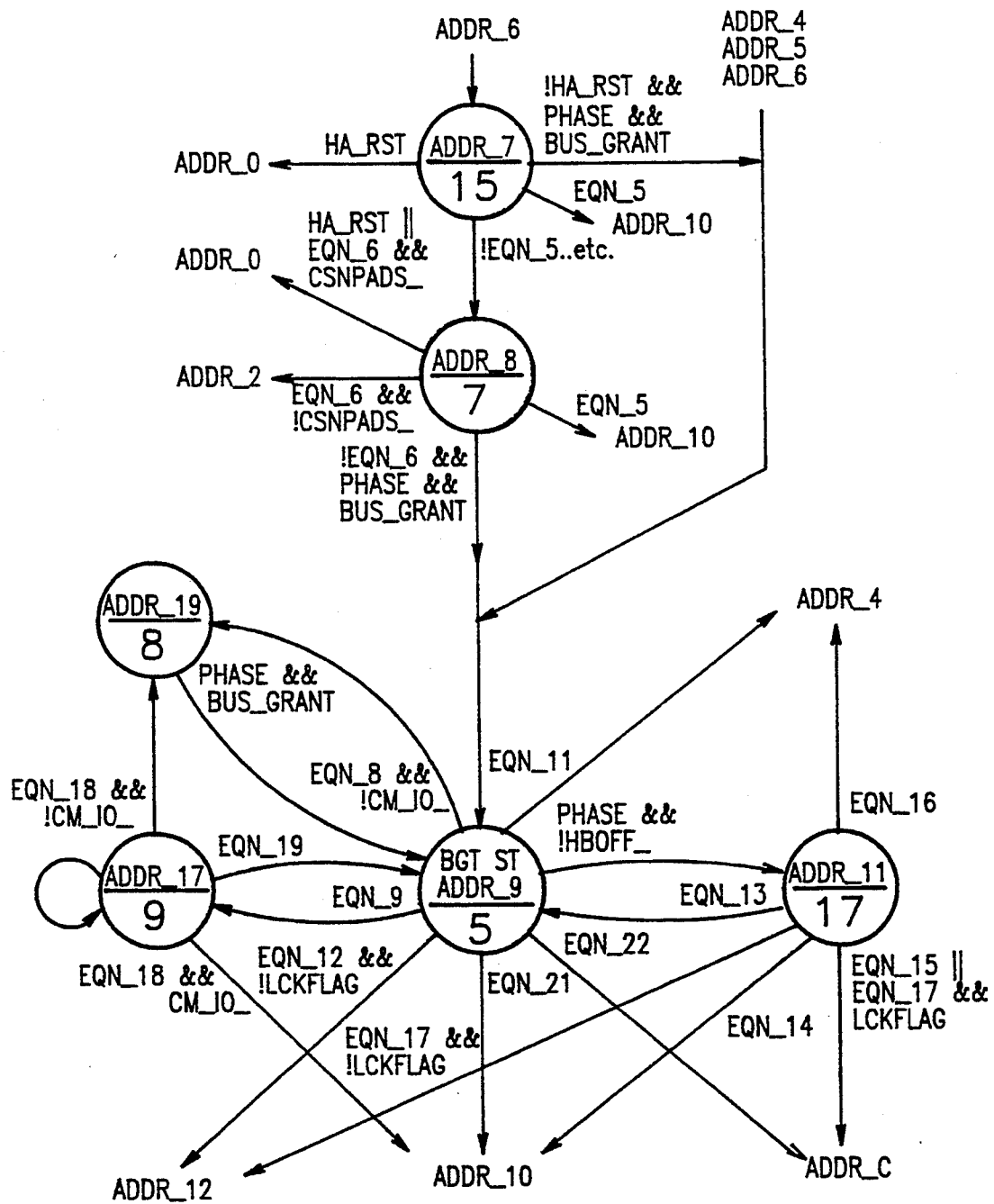
Figure 7A:
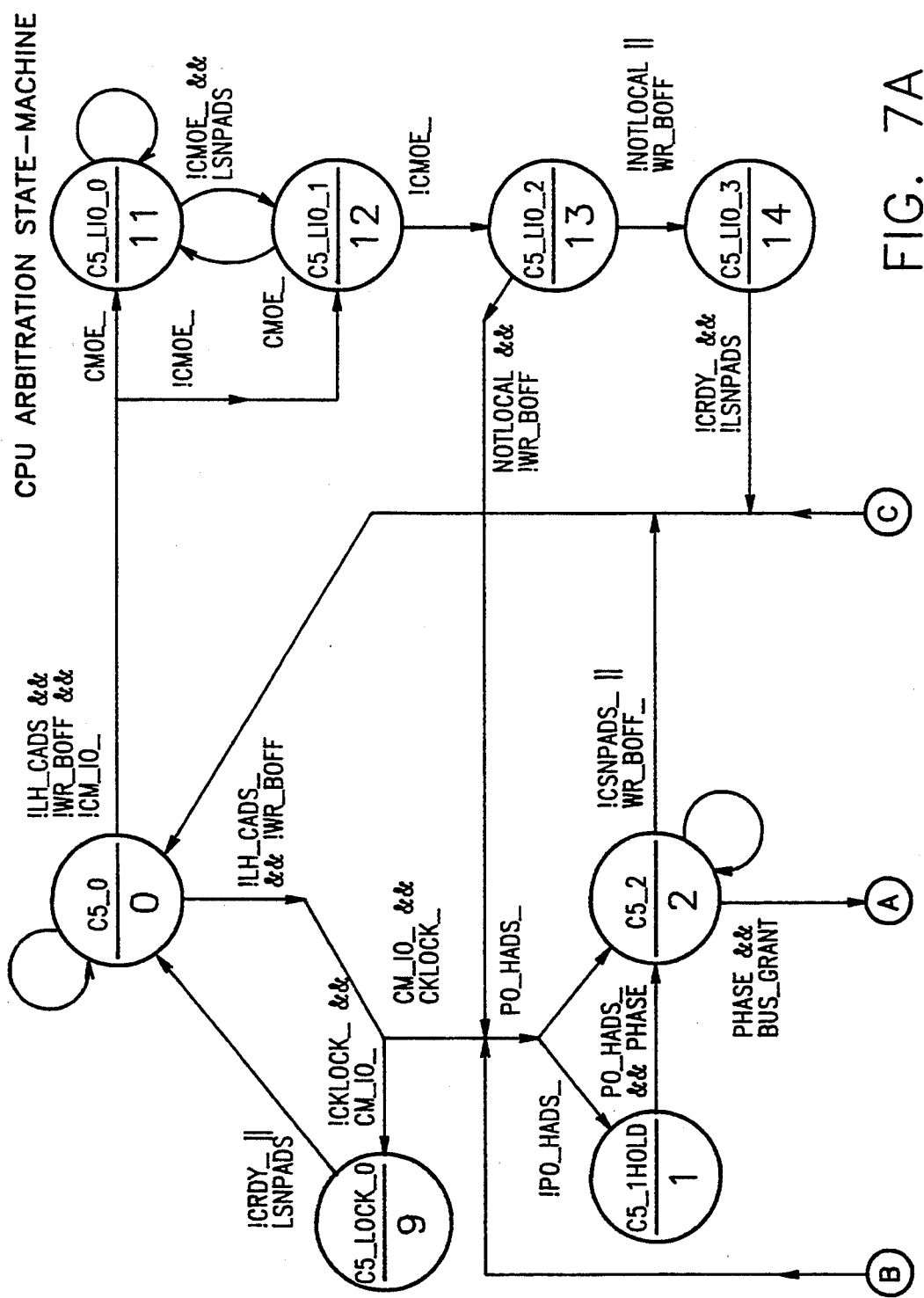
FIGS. 7A and 7B are state transition diagrams illustrating operation of the CPU arbitration logic of FIG. 3.
Figure 7B:
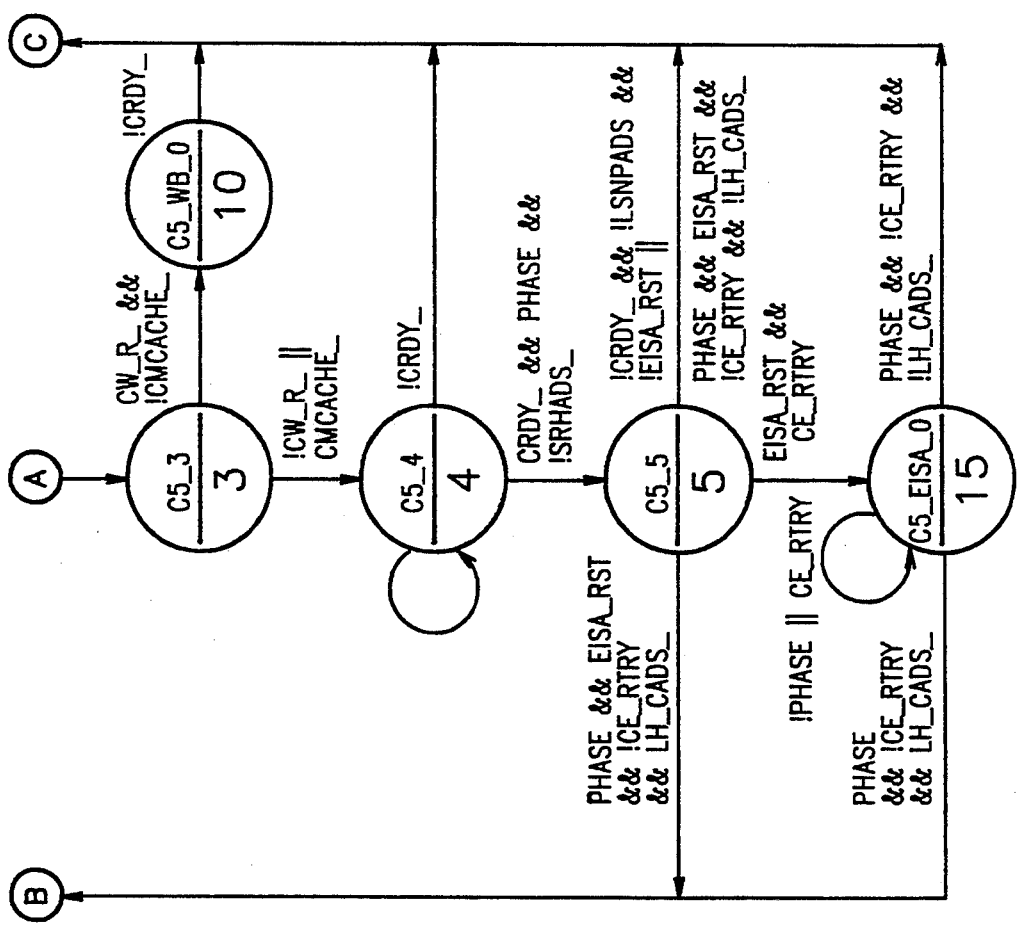

The address buffer state machine in FIGS. 6A and 6B illustrate operation of the address buffer control logic in controlling the address buffers 122.

CPU Arbitration state machine

A brief review of the signals used in the address buffer control state machine not previously described is deemed appropriate.

A signal referred to as PO_HADS is a signal that is a one PCLK signal cycle delayed version of the HADS_ signal.

A signal referred to as WR_BOFF is used to "back off" or interrupt certain write cycles. There are essentially three types of write cycles, these being a write-back cycle, a cache write to own cycle (read cache memory line fill) and a normal write cycle. The WR_BOFF signal is used to indicate that a normal write cycle is being backed off.

A signal referred to as SNPADS_ is a snoop address strobe signal generated by the cache controller 108, indicating the start of a snoop write-back.

A signal referred to as LSNPADS_ is a latched version of the SNPADS signal.

A signal referred to as CMCACHE_ is asserted during a read to indicate that the read cycle is cacheable and is asserted during a write cycle to indicate a write-back cycle.

A signal referred to as CMOE_ is an output enable signal that controls internal address latches in the cache controller 108. When asserted, the cache controller 108 can output an address.

A signal referred to as EISA_RST indicates that a single host/EISA bus transaction (up to 64 bits) is complete, and the next cycle of a multi-cycle transfer should be started.

A signal referred to as WB_ST is a write-back cycle strobe signal used to start write-back cycles.

The CPU arbitration logic is the main controller of CPU operations. When a request occurs to the cache interface logic 120 from either the cache controller or the host bus 24, the CPU arbitration state machine is begun. The CPU arbitration state machine in turn initiates other logic, i.e., kicks off other state machines, depending on the type of request.

Snoop state machines

Figure 8:
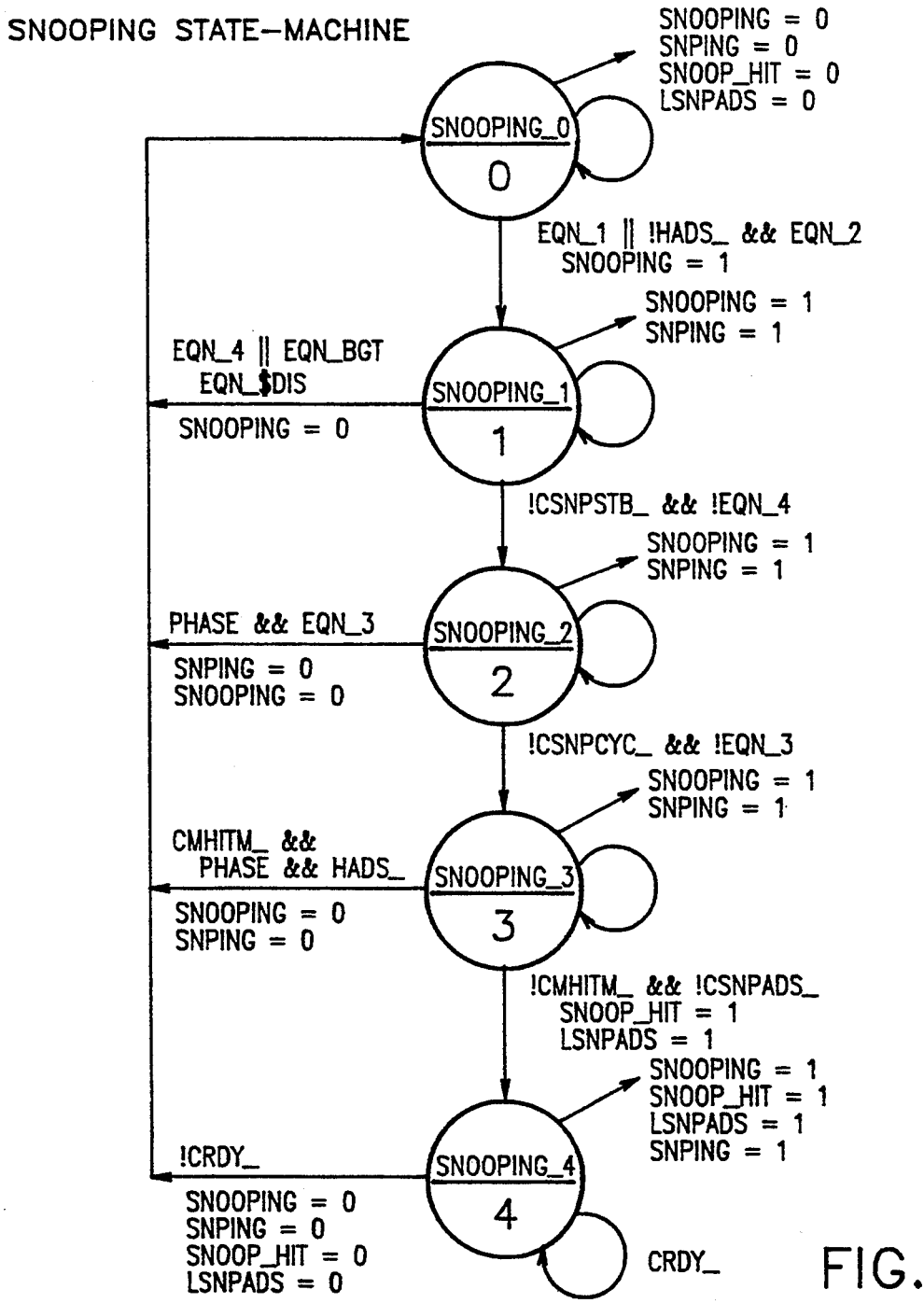
FIGS. 8 and 9 are state transition diagrams illustrating operation of the snoop control logic of FIG. 3.
Figure 9:
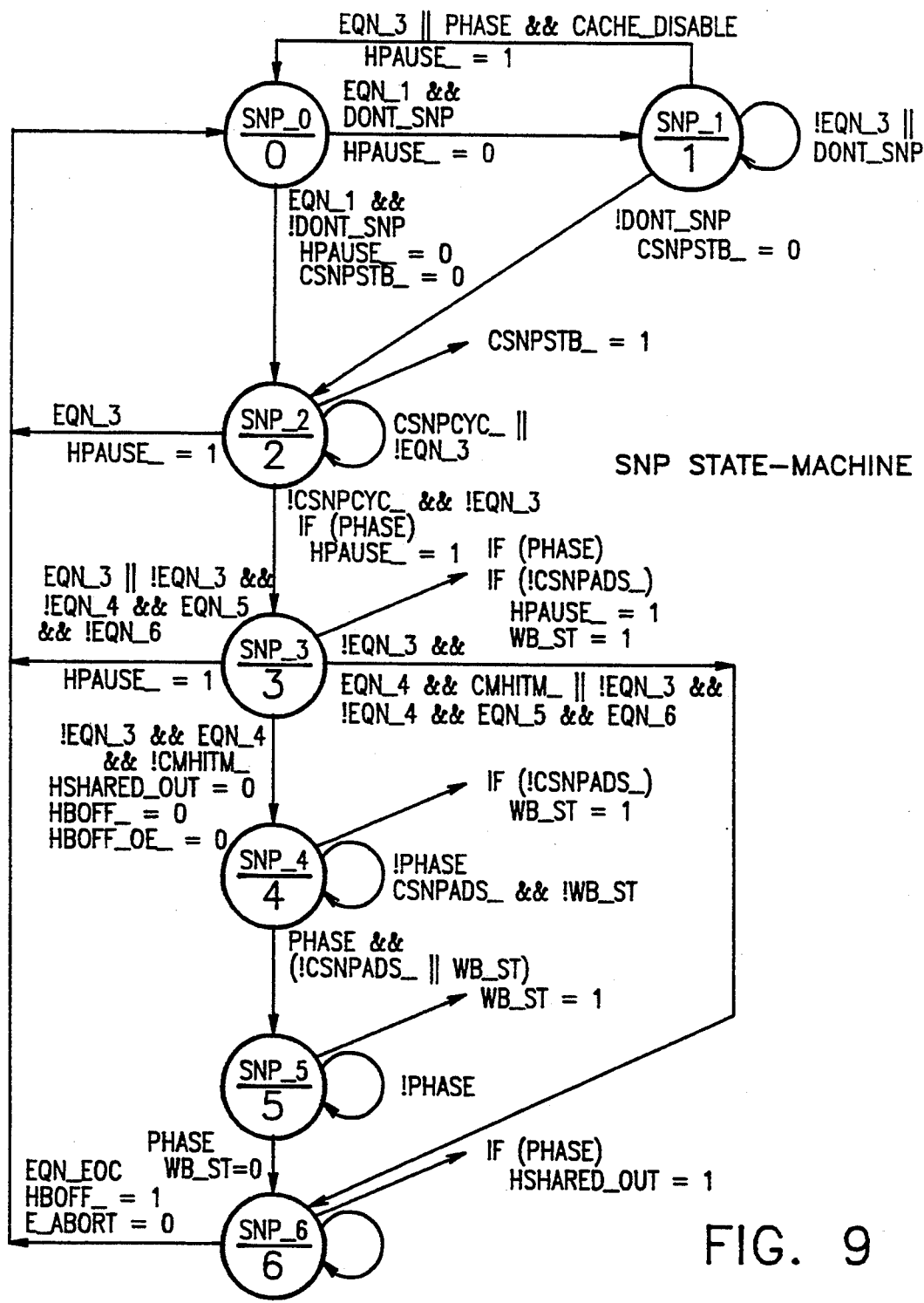

A brief review of the signals used in the snoop control state machines of FIGS. 8 and 9 that have not been previously described is deemed appropriate.

A signal referred to as CACHE_DISABLE indicates that the cache system is disabled.

A signal referred to as CMHITM_ indicates that a cache hit has occurred in the cache memory 110.

A signal referred to as LE_RTRY is similar to the CE_RTRY signal bus is used to tell LOCKed cycles to be retried.

A signal referred to as SNOOPING indicates that a snoop cycle is about to start or is in progress. It is deasserted when the snoop is a miss or the write-back data has been posted to the cache data buffer 124 and the cache controller cycle has finished on a snoop hit.

A signal referred to as SNPING is asserted when an actual snoop is in progress. It is deasserted when the cycle is a miss or when the write-back has been posted.

A signal referred to as MY_CYCLE indicates that the respective cache controller 108 has a cycle being performed on the host bus 24.

A cycle referred to as HNOSNP_ is asserted when a host bus cycle is known not to need to be snooped, for example, a write-back cycle, either because of a snoop hit to a dirty line, a flush, or a line replacement of a dirty line.

A signal referred to as HSHARED_OUT indicates if the current line snooped resides in the respective CPU's cache. It is used to tell the requesting CPU if it will have the data exclusively or not (i.e., allocate to a shared or exclusive cache state).

The SNPING state machine controls a snoop cycle from the start of the snoop cycle to the beginning of a write-back cycle when the address is output from the cache controller 108 and the write data is posted to the cache data buffer 124. The SNP state machine tracks snoop and write-back cycles until the end of the host write-back cycle to prevent an overload of data in the cache data buffer 124.

CONCURRENT POSTABLE I/O WRITES WITH SNOOP WRITE-BACKS

Figure 10A:
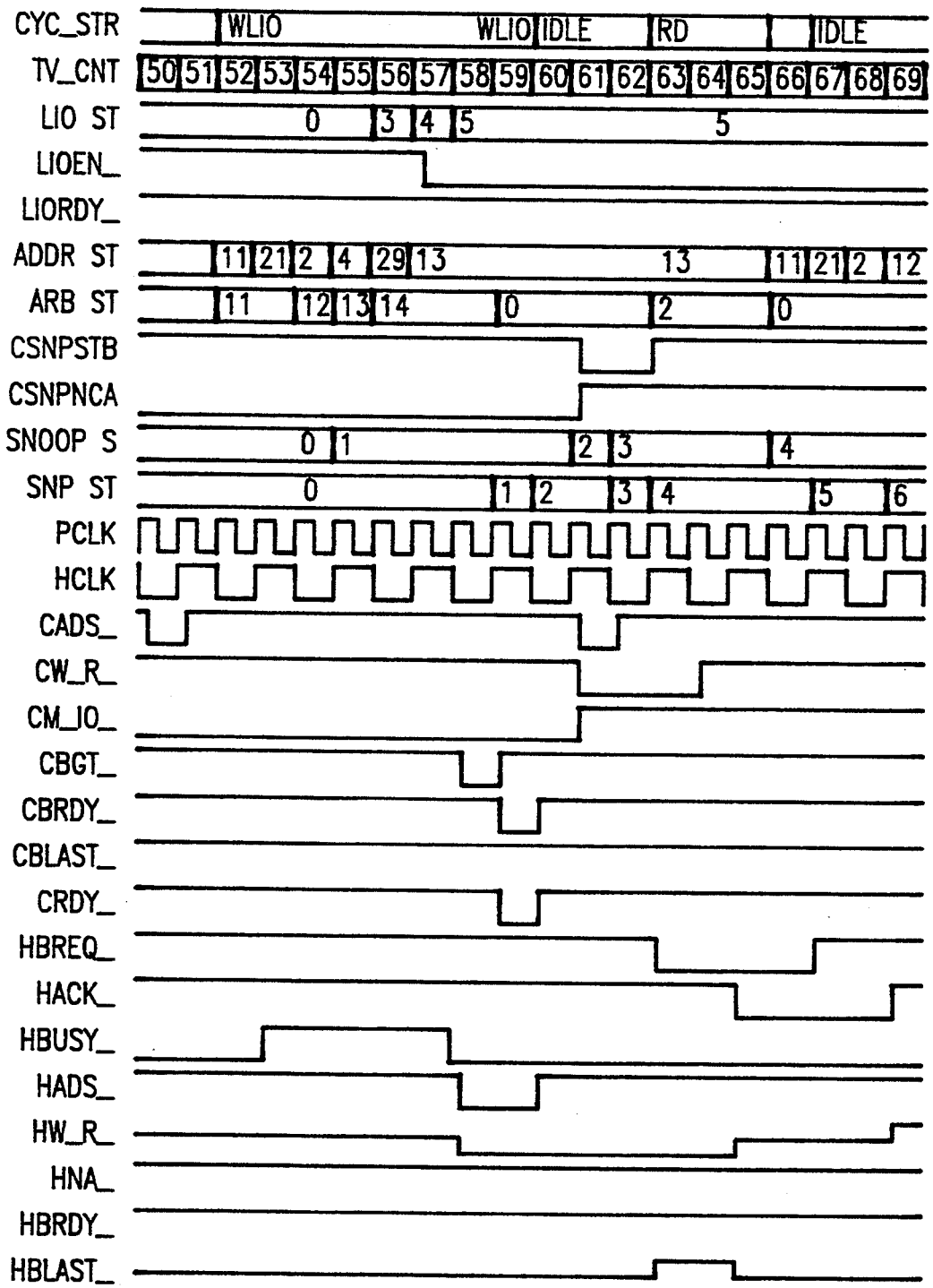
FIGS. 10A and 10B are timing diagrams illustrating operation of concurrent local I/O bus operations and snoop write-back operations.
Figure 10B:
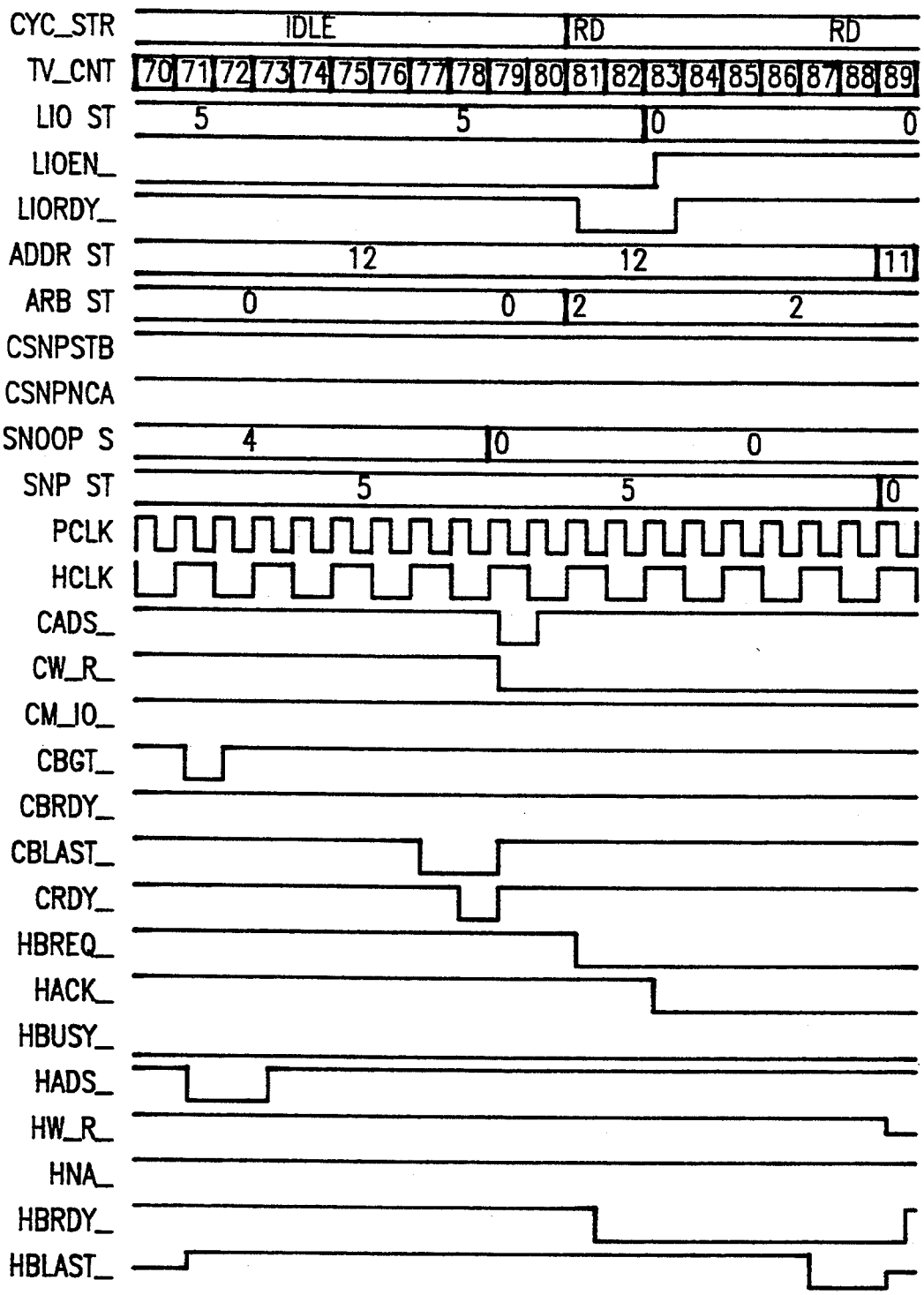

Referring now to FIGS. 10A–B, timing diagrams illustrating the concurrency of local I/O write cycles, snoop and snoop write-back cycles, and CPU cycles is shown. The timing diagram illustrates the concurrent operations of a postable local I/O write, a snoop cycle followed by a snoop write-back, and a second cache controller cycle request. The timing diagrams in FIGS. 10A–B also illustrate the respective states of the local I/O state machine, the address buffer state machine, the SNOOP and SNP state machines, and the CPU arbitration state machine during these concurrent cycles.

A brief review of the terms and signals used in the timing diagrams of FIGS. 10A–B is deemed appropriate.

The term CYC_STR is an information only line which provides a high level description of the type of cycle that is currently running. The term WLIO stands for local I/O write. The term RD stands for non I/O read cycle, and the term IDLE indicates that there is no pending CPU cycle, either because there is no request from the CPU, or the cache controller 108 is busy doing cache back-invalidations to the processor 102.

The term TV_CNT is an information only line, providing a number that can be associated with a specific PCLK cycle on this diagram. Cycle numbers mentioned in the detailed description are referenced in this row.

The term LIO.ST represents the current state of the local I/O state machine. The state numbers used in the timing diagrams correspond to the numeric value in the lower half of the circle comprising each state in FIGS. 4A-B.

A signal referred to as LIOEN (Local I/O Enable) is provided from the cache interface logic 120 to the cache data buffer 124 and DSP 126 and, when asserted, signifies that a local I/O cycle is in progress. The synchronously sampled falling edge signifies the start of the local I/O cycle, and the synchronously sampled rising edge signifies the end of the local I/O cycle.

As previously noted, the LIORDY. (local I/O ready) signal is provided from the cache data buffer 124 to the cache interface logic 120 to signify that local I/O data has been transferred and the local I/O cycle can be completed.

The term ADDR ST provides the value of the current state of the address buffer state machine. The address buffer state machine controls the host address buffers 122 (enabling, clocking and direction). The numeric value in the lower half of the state bubble of the address buffer state machine diagram may be used to follow the ADDR state machine's status/progress.

The term ARB ST provides the value of the current state of the CPU arbitration state machine. The numeric value in the lower half of the state bubbles of the state diagram may be used to follow the state machine's status/progress.

The term SNOOP S provides the value of the current state of the SNOOPING state machine. The numeric value in the lower half of the state bubbles of the SNOOPING state machine diagram may be used to follow the SNOOPING state machine's status/progress.

The term SNP ST provides the value of the current state of the SNP state machine. The numeric value in the lower half of the state bubbles of the SNP diagram may be used to follow the SNOOP state machine's status/progress.

The PCLK signal is the processor clocking signal having a frequency of 50 or 66 MHz.

The HCLK signal is the host bus clocking signal having a frequency one half of the processor clocking signal.

The CADS. signal is a cache address strobe signal asserted by the cache controller 108 to begin all cache controller external cycles. The CADS. cycle is active for one PCLK signal cycle.

The CW.R. signal is asserted by the cache controller 108 and indicates whether a write or read cycle is occurring. The CW.R. signal is high for write cycles and low for read cycles.

The CM.IO. signal is asserted by the cache controller 108 and is a logic high value to indicate a memory cycle and a logic low value to indicate an I/O cycle. The CM.IO. signal is low for both EISA I/O cycles and local I/O cycles.

The CBGT. signal is the cache controller bus guarantee or bus grant transfer signal and is a commitment on the part of the cache interface logic 120 to complete a transfer. The cache controller 108 is unable to snoop the host bus 24 after the CBGT. signal is asserted until the respective cycle completes.

The CBRDY. signal is a burst ready signal used to clock data into the CPU.

The CBLAST. signal is asserted to indicate that this is the last Qword to be clocked into the cache data buffer 124, either during the state of a host bus write cycle or towards the end of a host bus read cycle.

The CRDY. signal is used to indicate that a cache controller request is complete.

The HBREQ. signal is asserted by the cache interface logic 120 to request access to the host bus 24. This signal is typically asserted in response to issuance of the CADS. signal by the cache controller 108.

The HACK. signal is a host bus acknowledge signal issued by host bus arbiter logic in the memory controller 30. This signal indicates that the current request is scheduled to get the host bus 24 when the HBUSY. signal is sampled high.

The HBUSY. signal is used to finalize arbitration for the host bus 24. The HBUSY. signal is also asserted by a new bus master on each HCLK signal cycle after gaining control of the host bus 24.

The HADS. signal is a host bus address strobe signal indicating the start of a host bus address.

The HW.R signal indicates whether a write or read cycle is occurring on the host bus 24. The HW.R signal is high for write cycles and low for read cycles.

A signal referred to as HNA. is an input to the cache interface logic 120 which indicates pipelining may occur for the host bus address and status signals. The HNA. signal indicates that a new address may be generated by a new host bus master while a previous bus master is waiting for the end of its host bus read or write data transfer to complete.

A signal referred to as HBRDY. is the host bus burst ready signal and is used to inform the host bus master that a data transfer is complete.

A signal referred to as HBLAST. also indicates the last transfer of a host bus burst sequence and is activated by the respective bus master.

In cycles 51-52, the sampling of a synchronized version of the CADS. signal low, the CM.IO. signal low, and the CW.R. signal high, starts off a I/O write cycle, which may be either a local I/O write cycle or an EISA write cycle.

In cycles 52-54, in parallel, the following operations occur:

1) The CPU arbitration state machine waits for the address to become valid (state transition from 0 to 11), and starts the local I/O look-up in the local I/O address map (state transition 11 to 12).
2) The address buffer logic 144 prevents the host bus 24 from driving addresses towards the cache controller 108 for snooping and turns on the cache controller output addresses. The address buffer logic 144 then starts loading up the address in the host address buffers in case the address misses the local I/O address map (ADDR state transitions 12→11→21→2).

In cycle 55, the CPU arbitration state machine finds that the I/O address is a hit to the local I/O address map, and enables the local I/O state machine (CPU arbitration state transition from 12 to 13).

Also in cycle 55, both the address buffer and SNOOP state machines sample the HBUSY. signal high and the HACK. signal high, thus indicating a new host bus master is getting the host bus 24 and will be running a host bus cycle that will need to be snooped. The address buffer state machine turns off the cache controller address buffers since the local I/O decode has completed. The SNOOP state machine holds off starting any other cycles, but since the local I/O map look-up has already been done for the write, the SNOOP state machine will not prevent that cycle from starting.

In cycles 56–57, the local I/O state machine starts up (state transition from 0 to 3), and then asserts the LIO-EN. signal on a HCLK signal cycle boundary to signal the cache data buffer 124 and DSP 126 that a local I/O cycle is starting.

In cycles 57–58, since the Local I/O write was postable, the local I/O state machine asserts the CBGT. and CRDY. signals in cycles 57 and 58 respectfully.

In cycle 58, the SNP state machine samples the HADS. signal low, and since the cache controller 108 is in a non-snoopable window (from the CBGT. signal asserted to the end of the cycle; CBGT.→CRDY.), the SNP state machine must wait 1 PCLK signal cycle before causing the cache controller 108 to snoop the current host bus address (state transition from 0 to 1). Since the host bus 24 defaults to a 0 cycle snoop look-up, the SNP state machine must assert the HPAUSE. signal for at least 1 HCLK. signal cycle or until it knows if the snoop is a hit or miss.

In cycles 59–60, the SNP state machine can now assert the CSNPSTB. signal to the cache controller 108 to start a snoop cycle (state transition 1 to 2).

In cycle 60, the CPU arbitration state machine determines that the local I/O state machine has finished with the cache controller side of the local I/O write cycle, and returns back to state 0 (IDLE) to wait for another CPU request.

At this point the local I/O write and the SNOOP cycle are in full concurrence. This is a type 3 concurrency.

In cycle 61, upon sampling the CSNPCYC. signal low, the SNP state machine can deassert the HPAUSE. signal since it will have a snoop hit/miss indicator in the next PCLK signal cycle. The SNOOPING state machine transitions from state 0 to 1 upon sampling the CSNPCYC. signal low in preparation for checking the next PCLK signal cycle for a snoop hit/miss indicator.

In cycle 62, upon sampling the snoop hit indicator the SNOOPING state machine waits for the snoop write-back to start and later waits for the write-back to finish on the CPU/cache controller side. The SNP state machine also tracks the start of the write-back, but will be waiting for the snoop write-back to finish on the host bus 24. The CADS. signal is issued in this cycle, indicating a new CPU/cache controller cycle. However, the cycle cannot begin, and the CADS. signal will have to be reissued since there is a snoop hit.

In cycles 66–69, the CSNPADS signal is issued from the cache controller 108 to indicate the start of the snoop write-back cycle. The address buffer state machine latches in the write-back address (state transitions 13→11→21→2→12), and enables the host address buffers 122 to drive the host bus 24. The SNOOPING state machine samples the CSNPADS. signal low and transitions from state 3 to 4. The SNP state machine also samples the CSNPADS. signal low, but must wait for a HCLK signal edge before it transitions from state 4 to 5 (this is because the SNP state machine tracks the host bus 24, vs the SNOOPING state machine only tracking the cache controller 108).

At this point the local I/O write cycle and the snoop write-back cycle are in full concurrence. This is a type 3 concurrency.

From cycles 71–79, the write-back cycle is performed.

In cycle 79, with the issue of the CRDY. signal back to the cache controller 108, the SNOOPING state machine is done tracking the snoop write-back cycle.

In cycle 80, with the CADS. signal issued from the cache controller 108 indicating another processor request, the CPU arbitration state machine starts up.

At this point there is a three way concurrency: the local I/O write cycle, a snoop write-back cycle and a current CPU cycle. This is a type 6 concurrency, which also includes types 1, 2, and 3.

In cycle 83, with the sampling of the LIORDY. signal, the local I/O state machine has completed the local I/O write and deasserts the LIOEN. signal in response.

At this point the snoop write-back and the current CPU cycle are concurrent, this being a type 2 concurrency.

In cycle 89, with the sampling of the HBRDY. signal low and the HBLAST. signal low, the SNP state machine recognizes the snoop write-back is finished on the host bus 25 and the cache interface logic 120 can now start loading up the write-back buffer if the current cache controller request was a line replacement write-back.

EISA read and snoop write-back timing diagram

Figure 11A:
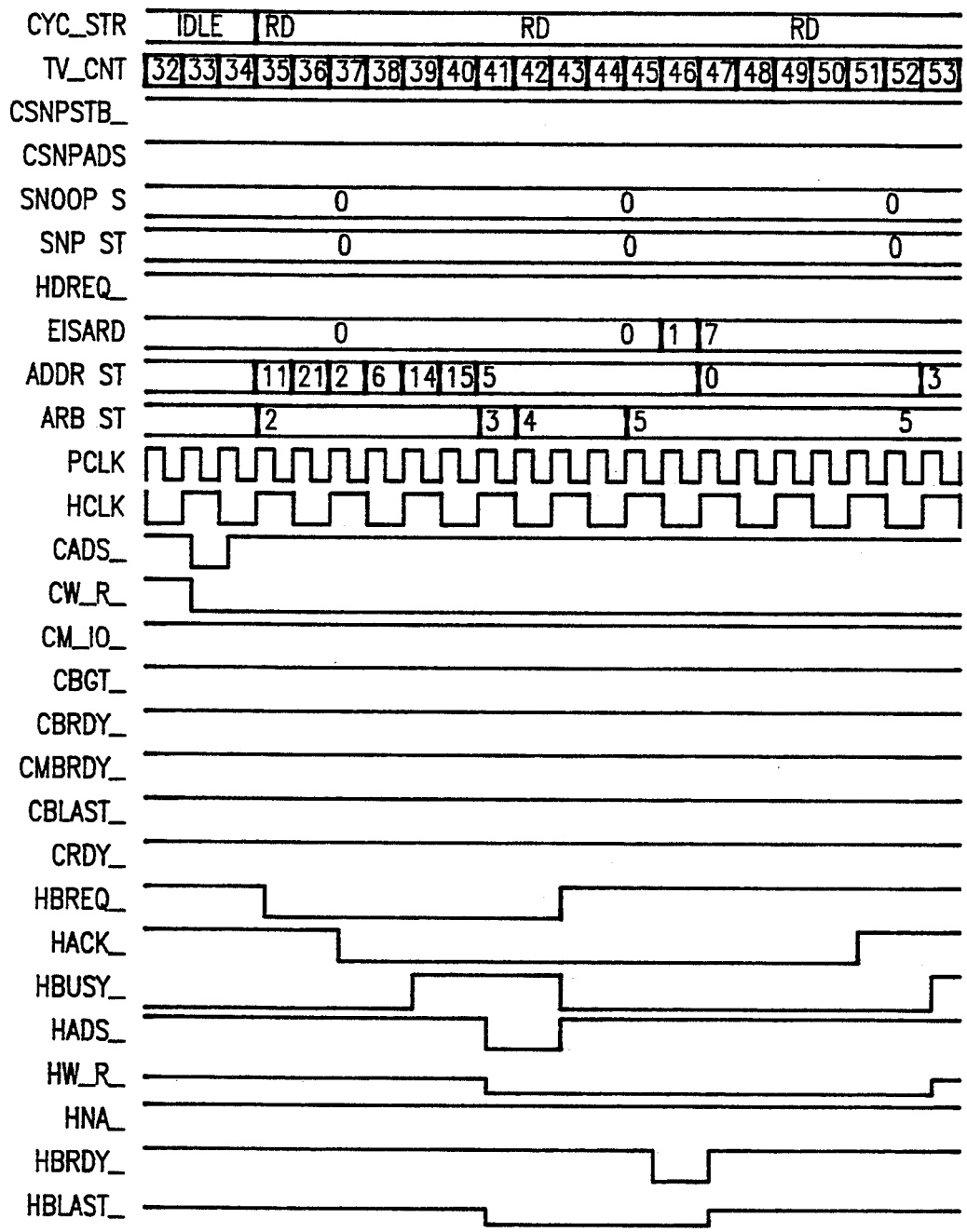
FIGS. 11A-C are timing diagrams illustrating operation of concurrent EISA read operations and snoop write-back operations.
Figure 11B:
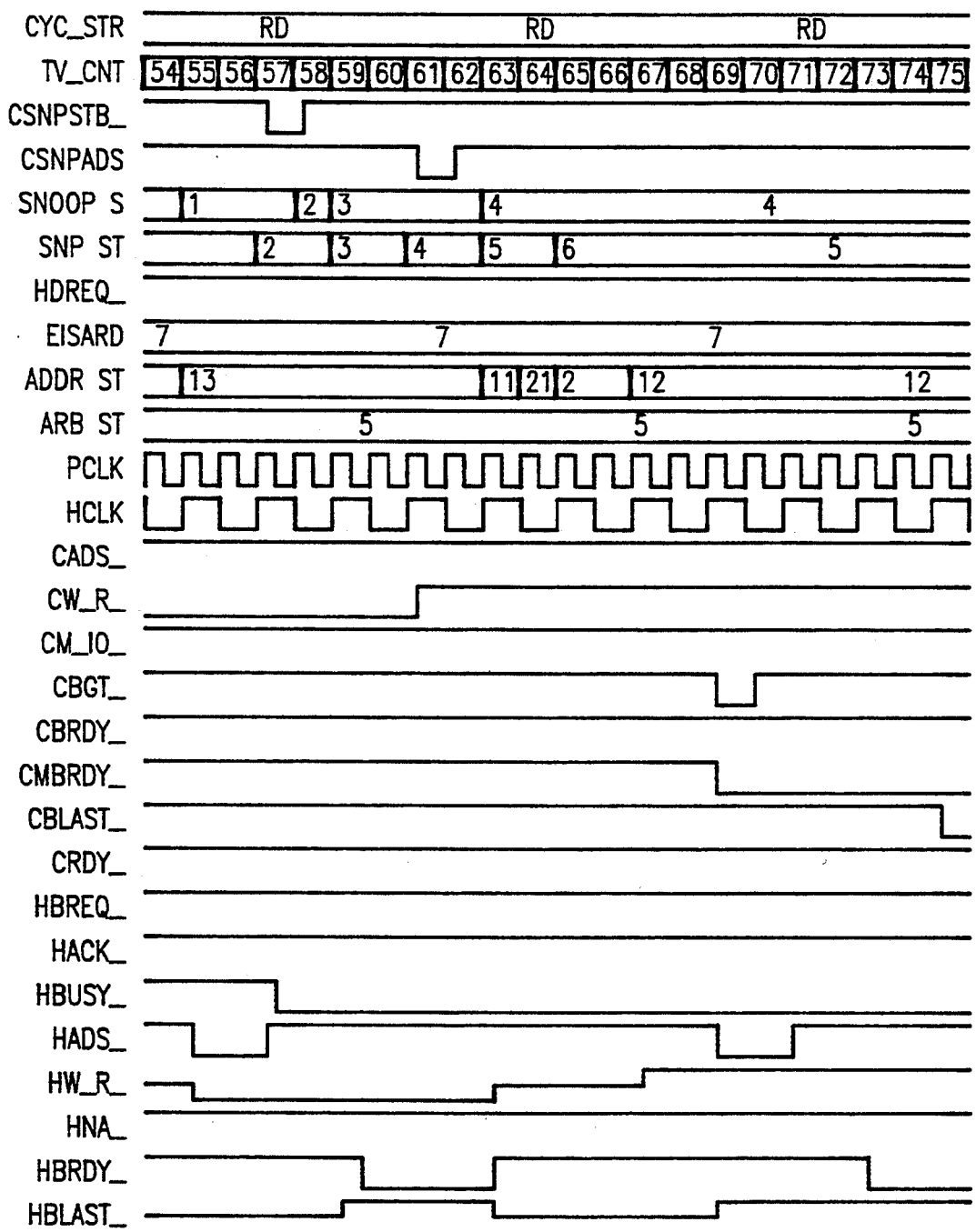
Figure 11C:
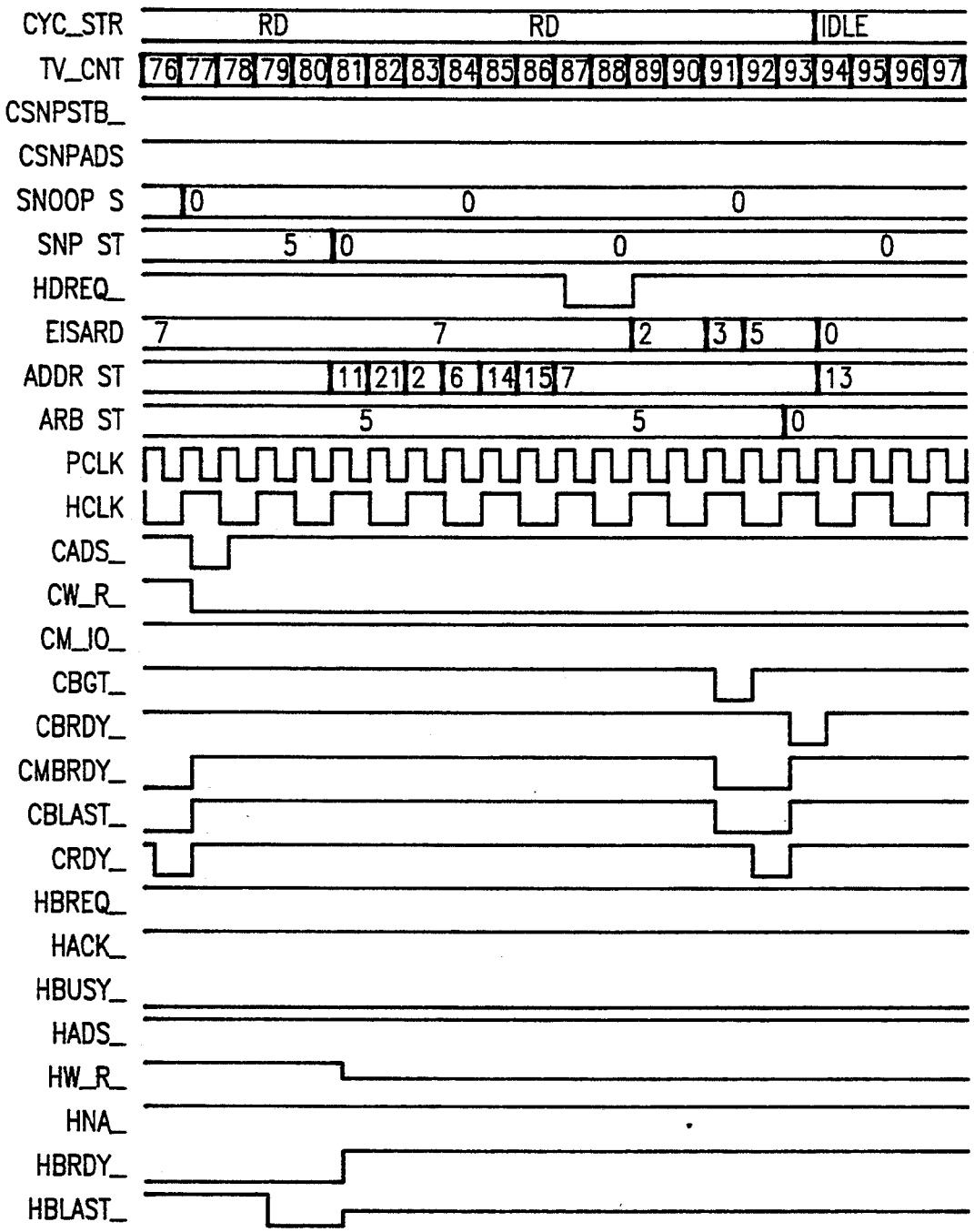

Referring now to FIGS. 11A–C, a timing diagram illustrating an EISA read cycle which includes a snoop write-back cycle is disclosed. The following timing diagrams illustrates concurrency types 4 and 5.

A brief review of the row designations and signals illustrated in the timing diagram of FIGS. 11A–C is deemed appropriate. Descriptions of signals previously introduced are repeated here for convenience.

At the top of the respective timing diagrams, the row indicated by "CYC.STR" indicates the type of cycle that is occurring on the host bus 24 at the respective time, either "IDLE," "RD" (read cycle), or "WR" (write cycle).

The row indicated by "TV.CNT" provides cycle numbers to properly identify points in the timing diagrams.

The CSNPSTB. signal is asserted by the cache interface logic 120 to the cache controller 108 to start a snoop cycle. A host bus cycle initiated by another bus master indicates that the host bus 24 should be snooped and, in response, the cache interface logic 120 asserts the CSNPSTB. signal to the cache controller 108.

The CSNPADS. signal indicates the start of a line write-back cycle that occurs after a snoop hit to a dirty line in the cache memory 110.

The HDREQ. signal is asserted and then deasserted to indicate that data is valid on the host data bus 24.

The row indicated by "EISA.RD" indicates the respective states of the EISA.RD state machine.

The PCLK signal is a processor clocking signal preferably having a frequency of 50 MHz.

The HCLK signal is a host bus clocking signal having a frequency half that of the PCLK signal, 25 MHz in the preferred embodiment.

The CADS. signal is a cache address strobe signal asserted by the cache interface logic 120 to begin all cache controller external cycles. The CADS. cycle is active for one PCLK signal cycle.

The CW.R. signal is asserted by the cache controller 108 and indicates whether a write or read cycle is occurring. The CW.R. signal is high for write cycles and low for read cycles.

The CM.IO. signal is asserted by the cache controller 108 and is a logic high value to indicate a memory cycle and a logic low value to indicate an I/O cycle. The CM_IO_ signal is low for both EISA I/O cycles and local I/O cycles.

The CBGT_ signal is the cache controller bus guarantee or bus grant transfer signal and is a commitment on the part of the cache interface logic 120 to complete a transfer. The cache controller 108 is unable to snoop the host bus 24 after the CBGT_ signal is asserted until the respective cycle completes.

The CMBRDY_ signal is asserted to clock data into or out of the cache memory 110 from the host bus 24.

The CBLAST_ signal is asserted to indicate that this is the last Qword to be clocked into the cache data buffer 124, either during the state of a host bus write cycle or towards the end of a host bus read cycle.

The CBRDY_ signal is a burst ready signal used to clock data into the CPU.

The HBREQ_ signal is asserted by the cache interface logic 120 to request access to the host bus 24. This signal is typically asserted in response to issuance of the CADS signal by the cache controller 108.

The HACK_ signal is a host bus acknowledge signal issued by host bus arbiter logic in the memory controller 30. This signal indicates that the current request is scheduled to get the host bus 24 when the HBUSY_ signal is sampled high.

The HBUSY_ signal is used to finalize arbitration for the host bus 24. The HBUSY_ signal is also asserted by a new bus master on each HCLK signal cycle after gaining control of the host bus 24.

The HADS_ signal is a host bus address strobe signal indicating the start of a host bus address.

The HW_R signal indicates whether a write or read cycle is occurring on the host bus 24. The HW_R signal is high for write cycles and low for read cycles.

The HNA_ signal is an input to the cache interface logic 120 which indicates pipelining may occur for the host bus address and status signals. The HNA_ signal indicates that a new address may be generated by a new host bus master while a previous bus master is waiting for the end of its host bus read or write data transfer to complete.

The HBRDY_ signal is the host bus burst ready signal and is used to inform the host bus master that a data transfer is complete.

The HBLAST_ signal indicates the last transfer of a burst sequence and is activated by the respective bus master.

At cycle 34, the sampling of the CADS_ signal low by the cache controller 108 causes it to request the host bus 24, signified by the HBREQ_ signal being low in cycle 36. The CPU arbitration state machine begins other state machines (not shown) which begin the read cycle and must wait to get control of the host bus 24 before continuing on.

In cycles 34-40, in parallel, while the cache interface logic 120 is waiting to gain bus mastership, the address buffer state machine loads the host address buffers 122 with the pending cycle address, the lower 2 bits of which are generated by the cache controller 108 for support of cache line fills from the EISA bus 42.

In cycle 41, with the sampling of the HBUSY_ signal high and the HACK_ signal low, the cache interface logic 120 begins a bus cycle. The cache interface logic 120 generates the host address strobe signal HADS. The address buffer state machine enables the host address buffers 122, and the host bus status signals HW_R, HM_ 10_, etc. are also generated.

In cycle 45, the sampling point of the memory mapper logic 34 occurs. The memory mapper logic 34 indicates this (not shown in the timing diagram) to be an access to nonlocal memory, i.e., to memory on the EISA bus 42. The EISA_FLAG signal is asserted to the EISA_RD state machine to indicate a successful posting. The EISA_RD state machine transitions from state E0 to state E1.

In cycle 47, the cache interface logic 120 samples the HBRDY_ and the HBLAST_ signals low, indicating that the host data bus cycle is finished. The EISA_RD state machine transitions from state 1 to state 7. Also, the return of requested data from the posted read cycle is possible any time in the future, (this would be signified by the HDREQ_ signal going low and high). After this time, another CPU can gain control of the host bus 24.

In cycle 53, the address buffer state machine samples the HACK_ signal high and thus can cause a bus rearbitration. The address buffer state machine immediately tri-states all host bus signals except for the HBUSY_ signal, which is driven high for 1 HCLK signal cycle and then tri-stated.

In cycle 55, with the HBUSY_ and HACK_ signals high, the SNOOPING state machine predicts that a host bus cycle will soon need to be snooped (state transition from 0 to 1).

The address buffer state machine tri-states the HBUSY_ signal at this time. The HBUSY_ signal stays high for one more HCLK signal cycle, as it was driven high and has a pull-up resistor on it and the next bus master will not drive this signal active until cycle 57.

In cycle 57, the SNP state machine samples the HADS_ signal active, indicating a valid address is available, and asserts the CSNPSTB signal to the cache controller 108 to cause it to snoop the cycle.

In cycle 58, the SNOOPING state machine tracks the start of the snoop cycle and waits for a snoop response signal referred to as CSNPCYC_ from the cache controller 108.

In cycle 59, both the SNP and SNOOPING state machines sample the CSNPCYC_ signal (not shown) active. In the next PCLK signal cycle, if a snoop hit occurs, the snoop look up status signal CMHITM_ will be valid.

In cycle 60, the CMHITM_ signal (not shown) is asserted by the cache controller 108, indicating a snoop hit.

In cycle 61, the SNP state machine (transition 3 to 4) recognizes the CMHITM_ signal is active. This recognition is delayed because the state machine tracks the host bus 24, and thus it samples signals on HCLK signal cycle boundaries.

In cycles 62-63, the CSNPADS_ signal is asserted by the cache controller 108, indicating a snoop write-back cycle is starting. The SNOOPING state machine advances (transition 3 to 4) to wait for the end of the snoop write-back cycle with the assertion of the CRDY_ signal. The SNP state machine advances from state 4 to 5 to 6 to wait for the end of the snoop write-back cycle to the host bus 24. The address buffer state machine advances (13 to 11 to 21 . . . ) to load the host address buffers 122 with the snoop write-back address at this time.

In cycles 64-76 the write-back cycle occurs.

In cycle 77 (FIG. 11C), the SNOOPING state machine samples the CRDY_ signal low, indicating the end of the snoop write-back cycle from the cache controller side. The EISA read cycle is reissued between cycles 77 and 81 due to the write back interruption.

In cycle 81, with the sampling of the HBRDY. signal low and the HBLAST. signal low, the host bus cycle which was the object of the write-back completes. The address buffer state machine transitions from state 12 back to 11 since it recognizes that the cache controller cycle is still pending, signified by the CADS. signal going back low in cycle 78. The address buffer state machine reloads the host address buffers 122 just in case this cycle is an EISA cache memory line fill. Also, in cycle 81, the SNOOPING state machine returns to idle (state 0) now that the snoop write-back cycle has completed on the host bus 24.

In cycle 89, the EISA RD state machine samples the HDREQ. signal low, indicating data will be valid when the HDREQ. signal goes high. The EISA_RD state machine then advances to state E2.

In cycle 91, the EISA_RD state machine samples the HDREQ. signal high, thus indicating that the host bus has valid data. The EISA_RD state machine then advances to state E3.

The EISA_RD state machine now tells the cache controller 108 it is beginning the cycle by asserting the CBGT. signal low. The cache controller 108 is unable to snoop from the CBGT. signal being asserted low until the end of the cycle, signified by the CRDY. signal being asserted. By not issuing the CBGT. signal until cycle 91 (sampled in 92), the cache controller 108, except for the small window (cycles 92 and 93), was able to snoop the entire time. This allowed other host bus masters to be able to concurrently use the host bus 24 during this time, thus increasing system efficiency.

The EISA read begun at cycle 34 and the snoop and write-back cycles begun at cycle 58 illustrate concurrency types 4 and 5.

In cycle 92 the EISA_RD state machine issues the CRDY. signal in the next PCLK signal cycle after the CBGT. signal is asserted to minimize the cache controller 108 non-snoop window. The EISA_RD state machine also advances to state E5.

In cycle 93 the CPU arbitration state machine samples the CRDY. signal active, indicating this CPU request has finished.

In cycle 94, the EISARD state machine resets the address buffer state machine and returns to its idle state, state E0.

Conclusion

Therefore, a computer system which conducts various levels of concurrent operations to increase system efficiency is disclosed. The computer system implements various types of concurrency, including:

1) a current CPU cycle concurrent with a previously posted local I/O write;
2) a current CPU cycle concurrent with a local memory write-through or local memory write-back;
3) a current local I/O cycle (postable or not) concurrent with snooping a host bus address and processing the possible write-back;
4) an EISA bus read concurrent with host bus cycles that cause snooping and write-backs;
5) an EISA bus cache memory read line-fill concurrent with host bus cycles that cause snooping and write-backs or other EISA bus accesses from other processors; and
6) a postable local I/O write concurrent with a snoop of a host bus transaction, concurrent with a current CPU cycle request.

The foregoing disclosure and description of the invention are illustrative and explanatory thereof, and various changes in the size, shape, materials, components, and circuit elements, as well as in the details of the illustrated circuitry and construction and method of operation may be made without departing from the spirit of the invention.

We claim:

1. A computer system which performs concurrent bus cycle operations, comprising:
   a host bus;
   an expansion bus coupled to said host bus;
   expansion bus memory coupled to said expansion bus, said expansion bus memory storing data;
   a processor;
   a cache system coupled to said processor and to said host bus, said cache system including a cache controller and cache memory, wherein said cache controller snoops said host bus when said cache controller does not control said host bus and generates write-back cycles when a snoop hit occurs to a dirty line in said cache memory, wherein said cache controller generates expansion bus read cycles when said processor requests data residing in said expansion bus memory that does not reside in said cache memory;
   cycle generation means coupled to said cache system and said host bus for generating an expansion bus read cycle after said processor requests data residing in said expansion bus memory that does not reside in said cache memory;
   a bus master coupled to said host bus which generates cycles onto said host bus which must be snooped by said cache controller; and
   an expansion bus controller coupled between said host bus and said expansion bus which latches the address of said expansion bus read cycle and obtains said requested data from said expansion bus memory, wherein said expansion bus controller obtains said requested data concurrently with said cache controller snooping said bus master host bus cycle.

2. The computer system of claim 1, wherein when said bus master host bus cycle causes a snoop hit to a dirty line in said cache memory, said cache controller performs a write-back cycle on said host bus concurrently with said expansion bus controller obtaining said requested data.

3. The apparatus of claim 2, wherein said cycle generation means comprises:
   latching means coupled to the cache controller and the host bus for latching an address generated by the cache controller during an expansion bus read cycle; and
   presenting means coupled to said latching means for presenting the address of said expansion bus read onto the host bus.

4. A computer system which performs concurrent bus cycle operations, comprising:
   a host bus;
   a processor coupled to said host bus;
   a plurality of processor ports storing data;
   a local I/O bus coupled between said processor and said processor ports;
   a cache system coupled between said local I/O bus and said processor and further coupled between said processor and said host bus, said cache system including a cache controller and cache memory, wherein said cache controller snoops said host bus when said cache controller does not control said host bus and generates write-back cycles when a snoop hit occurs to a dirty line in said cache memory;

cycle generation means coupled to said cache system and said local I/O bus for generating a local I/O cycle after said processor writes or reads data to or from one of said processor ports that does not reside in said cache memory; and a bus master coupled to said host bus which generates cycles onto said host bus which must be snooped by said cache controller; and wherein said cache controller snoops said bus master host bus cycle approximately concurrently with said cycle generating means generating said local I/O cycle.

5. The computer system of claim 4, wherein said processor generates a processor cycle to said cache system concurrently with said cache controller snooping said bus master host bus cycle and said cycle generating means generating said local I/O cycle.

6. The computer system of claim 4, wherein said local I/O cycle is a postable write cycle writing data to one of said processor ports, the computer system further comprising:

a data buffer coupled between said cache memory and said processor ports which receives said write data from said cache memory; and wherein said cache controller snoops said bus master host bus cycle concurrently with said cache memory providing said write data to said data buffer.

7. A method for performing concurrent operations in a computer system comprising a host bus; a processor coupled to the host bus; a bus master coupled to the host bus; a cache system coupled between the host bus and the processor, the cache system including a cache controller that snoops host bus cycles when said cache controller does not control said host bus and performs write-back cycles when a snoop hit occurs to a dirty line in said cache memory an expansion bus coupled to the host bus; an expansion bus controller coupled between said host bus and said expansion bus; and cache interface logic which generates cache controller cycles onto said host bus, the method comprising:

a) the cache controller generating an expansion bus read cycle including an address of requested data;
b) the cache interface logic latching said address;
c) the cache interface logic presenting said address onto the host bus after step b);
d) the expansion bus controller latching said expansion bus read cycle address after step c);
e) the bus master performing a host bus cycle that is required to be snooped by the cache controller
f) the expansion bus controller performing expansion bus cycles to obtain the requested data after step d); and
g) the cache controller snooping said bus master host bus cycle concurrently with step f).

8. The method of claim 7, further comprising:

h) the cache controller completing snooping said bus master host bus cycle after step g);
i) the expansion bus controller presenting said requested data onto the host bus; and
j) the cache controller obtaining said requested data from the host bus after step i).

* * * * *

UNITED STATES PATENT AND TRADEMARK OFFICE
CERTIFICATE OF CORRECTION

PATENT NO. :   5,353,415
DATED      :   October 4, 1994
INVENTOR(S):   Jeff W. Wolford, et al.

It is certified that error appears in the above-identified patent and that said Letters Patent is hereby corrected as shown below:

In column 31, line 15, please delete "approximately".

In column 32, line 7, after "memory" please insert --;--.

Signed and Sealed this

Twenty-eight Day of February, 1995

Attest:

BRUCE LEHMAN

*Attesting Officer*     *Commissioner of Patents and Trademarks*

UNITED STATES PATENT AND TRADEMARK OFFICE
CERTIFICATE OF CORRECTION

| | | |
|---|---|---|
| PATENT NO. | : 5,353,415 | Page 1 of 1 |
| APPLICATION NO. | : 07/955477 | |
| DATED | : October 4, 1994 | |
| INVENTOR(S) | : Wolford et al. | |

It is certified that error appears in the above-identified patent and that said Letters Patent is hereby corrected as shown below:

In column 6, line 65, please delete the phrase "cache memory 110" and replace with the phrase --cache interface logic 120--.

Signed and Sealed this

Twentieth Day of February, 2007

JON W. DUDAS
*Director of the United States Patent and Trademark Office*